US012725786B1

(12) United States Patent
Ye et al.

(10) Patent No.: US 12,725,786 B1
(45) Date of Patent: Sep. 1, 2026

(54) BATTERY CELL, BATTERY APPARATUS, POWER CONSUMING APPARATUS, AND ENERGY STORAGE APPARATUS

(71) Applicant: CONTEMPORARY AMPEREX TECHNOLOGY CO., LIMITED, Ningde (CN)

(72) Inventors: Xinde Ye, Ningde (CN); Xiaofeng Zhang, Ningde (CN); Xiaoyang Jia, Ningde (CN); Jia Li, Ningde (CN); Tianyue Yuan, Ningde (CN); Song Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/378,344

(22) Filed: Nov. 4, 2025

Related U.S. Application Data

(63) Continuation of application No. PCT/CN2025/094374, filed on May 12, 2025.

(51) Int. Cl.
*H01M 4/36* (2006.01)
*H01M 4/133* (2010.01)
(Continued)

(52) U.S. Cl.
CPC ........... *H01M 4/364* (2013.01); *H01M 4/133* (2013.01); *H01M 4/136* (2013.01); *H01M 4/623* (2013.01);
(Continued)

(58) Field of Classification Search
CPC .. H01M 4/364; H01M 50/489; H01M 50/105; H01M 50/184; H01M 50/119;
(Continued)

(56) References Cited

U.S. PATENT DOCUMENTS

2009/0186277 A1* 7/2009 Beck ................... H01M 10/052 429/231.95
2018/0138512 A1* 5/2018 Bélanger ............... H01M 4/366
(Continued)

FOREIGN PATENT DOCUMENTS

CN 110416467 A 11/2019
CN 109148836 B 1/2022
(Continued)

OTHER PUBLICATIONS

First Office Action received in the counterpart CN application No. 202510757151.X, dated Jul. 26, 2025, 13 pages with English translation.
(Continued)

*Primary Examiner* — James M Erwin
(74) *Attorney, Agent, or Firm* — K&L Gates LLP

(57) ABSTRACT

A battery cell, a battery apparatus, a power consuming apparatus, and an energy storage apparatus are disclosed. The battery cell includes a stacked electrode assembly having a positive electrode plate, a negative electrode plate, and a separator disposed between them. The positive electrode plate includes a current collector and a film layer containing lithium-containing transition metal phosphate particles, at least partly coated with carbon. In a cross-section of the film layer along the thickness direction, 12% to 50% of the particles have a size of 1 μm or greater. The separator includes a base film, ceramic layers on both sides of the base film, and a bonding layer disposed on at least one ceramic layer facing the positive electrode plate. The bonding layer is a continuous porous layer comprising a vinylidene fluoride polymer, which enhances adhesion and thermal stability of the separator.

22 Claims, 3 Drawing Sheets

(51) Int. Cl.

| | |
|---|---|
| ***H01M 4/136*** | (2010.01) |
| ***H01M 4/62*** | (2006.01) |
| ***H01M 50/105*** | (2021.01) |
| ***H01M 50/119*** | (2021.01) |
| ***H01M 50/184*** | (2021.01) |
| ***H01M 50/434*** | (2021.01) |
| ***H01M 50/457*** | (2021.01) |
| ***H01M 50/489*** | (2021.01) |
| *H01M 4/02* | (2006.01) |

(52) U.S. Cl.
CPC ......... *H01M 4/625* (2013.01); *H01M 50/105* (2021.01); *H01M 50/119* (2021.01); *H01M 50/184* (2021.01); *H01M 50/434* (2021.01); *H01M 50/457* (2021.01); *H01M 50/489* (2021.01); *H01M 2004/021* (2013.01); *H01M 2004/028* (2013.01); *H01M 2220/20* (2013.01)

(58) Field of Classification Search
CPC .. H01M 50/457; H01M 50/434; H01M 4/133; H01M 4/136; H01M 4/623; H01M 4/625; H01M 2004/021; H01M 2004/028; H01M 2220/20
USPC .......................................................... 429/209
See application file for complete search history.

(56) References Cited

U.S. PATENT DOCUMENTS

| | | | | |
|---|---|---|---|---|
| 2018/0315996 | A1 | 11/2018 | Yura et al. | |
| 2021/0257619 | A1* | 8/2021 | Chen | H01M 10/0525 |
| 2022/0029157 | A1* | 1/2022 | Song | H01M 10/0525 |
| 2022/0123291 | A1 | 4/2022 | Wang et al. | |
| 2022/0328811 | A1* | 10/2022 | Fu | H01M 4/587 |
| 2022/0344653 | A1* | 10/2022 | Chang | H01M 4/525 |
| 2022/0416242 | A1* | 12/2022 | Tanaka | H01M 4/62 |
| 2024/0030497 | A1* | 1/2024 | Isobe | H01M 50/636 |
| 2024/0076531 | A1* | 3/2024 | Zhao | H01M 10/052 |
| 2024/0154127 | A1* | 5/2024 | Han | H01M 4/5825 |

FOREIGN PATENT DOCUMENTS

| | | | |
|---|---|---|---|
| CN | 114245940 | A | 3/2022 |
| CN | 115513515 | A | 12/2022 |
| CN | 117865099 | A | 4/2024 |
| JP | 2017216149 | A | 12/2017 |
| JP | 2019102260 | A | 6/2019 |
| WO | 2019094063 | A1 | 5/2019 |
| WO | 2024066071 | A1 | 4/2024 |
| WO | 2024234544 | A1 | 11/2024 |
| WO | 2024253469 | A1 | 12/2024 |

OTHER PUBLICATIONS

The international search report received in the counterpart PCT Application No. PCT/CN2025/094374, dated Nov. 11, 2025, 5 pages with English translation.

* cited by examiner

20

203

202

201

202

203

BATTERY CELL, BATTERY APPARATUS, POWER CONSUMING APPARATUS, AND ENERGY STORAGE APPARATUS

CROSS-REFERENCE TO RELATED APPLICATIONS

This application is a continuation of International Patent Application No. PCT/CN2025/094374 filed on May 12, 2025, the content of which is incorporated herein by reference in its entirety.

TECHNICAL FIELD

This application relates to the field of battery cell technologies, and in particular, to a battery cell, a battery apparatus, a power consuming apparatus, and an energy storage apparatus.

BACKGROUND

In recent years, battery cells have been widely used in energy storage power supply systems such as water power stations, thermal power stations, wind power stations, and solar power stations, and in a plurality of fields such as electric tools, electric bicycles, electric motorcycles, electric vehicles, military equipment, and aerospace.

Accompanied with dual improvement of demands on endurance mileage and cycle life of power consuming apparatuses in the market, higher requirements are also put on the capacity, the cycle performance, and the like of the battery cell. However, it is difficult to improve all of the foregoing performance together in the existing technology. This becomes a technical problem that needs to be resolved urgently in the art.

SUMMARY

This application is disclosed in view of the foregoing issue, and an objective of this application is to provide a battery cell having a high capacity and good cycle performance.

A first aspect of this application provides a battery cell, including a stacked electrode assembly, where the stacked electrode assembly includes a positive electrode plate, a negative electrode plate, and a separator disposed between the positive electrode plate and the negative electrode plate; the positive electrode plate includes a positive current collector and a positive electrode film layer disposed on at least one side of the positive current collector, the positive electrode film layer includes lithium-containing transition metal phosphate particles, and at least a portion of a surface of the lithium-containing transition metal phosphate particles is provided with a carbon material; in a cross-section of the positive electrode film layer in a thickness direction of the electrode plate, an area percentage of particles whose particle size is greater than or equal to 1 μm ranges from 12% to 50%; and the separator includes a base film, a ceramic layer disposed on each of two sides of the base film, and a bonding layer disposed on a side of the ceramic layer at least close to a side of the positive electrode plate away from the base film, the bonding layer is a continuous layer with a porous structure, and the bonding layer includes a vinylidene fluoride polymer.

The applicant finds that, when an area percentage of particles whose particle size is greater than or equal to 1 μm in a cross-section of the positive electrode film layer in a thickness direction of the electrode plate is less than 12%, insufficient particle grading significantly limits space for increasing a compaction density, making it difficult to effectively improve a battery capacity. However, when an area percentage of particles whose particle size is greater than or equal to 1 μm in a cross-section of the positive electrode film layer in a thickness direction of the electrode plate is greater than 50%, excessive large particles cause a severe rebound phenomenon in the positive electrode film layer, causing SEI film breakage and film layer splitting, increasing a short circuit risk, and negatively affecting the cycle performance of the battery.

According to this embodiment of this application, a stacked electrode assembly is matched with a lithium-containing transition metal phosphate positive electrode film layer having a particular content of large particles to improve the battery capacity, a separator provided with a ceramic layer on each of both sides is further used, to improve the stiffness of the separator, and a separator having continuous layers with a porous structure and having a larger bonding area and a stronger bonding force is used, to increase the bonding function between the separator and the positive electrode plate, improve the compactness and the stiffness of a group inside the stacked electrode assembly, make up for deficiency of a small external binding force of the stacked electrode assembly, reduce the risk that mutual pressing in the thickness direction of the positive and negative electrode plates become misplaced horizontally in a process of rebounding of the electrode assembly, and reduce the risk that the positive and negative electrode overlap and further cause a short circuit, so that the cycle performance of the battery is further improved on the basis of a good capacity of the battery.

In any implementation, in the cross-section of the positive electrode film layer in the thickness direction of the electrode plate, an area percentage of particles whose particle size ranges from 1 μm to 5 μm ranges from 12% to 50%.

The area percentage of the particles whose particle size ranges from 1 μm to 5 μm in the cross-section of the positive electrode film layer in the thickness direction of the electrode plate is within the foregoing range, which helps the battery maintain a high capacity, thereby improving a phenomenon of rebounding of large particles in the electrode plate during a battery cycle, and improving the cycle performance of the battery.

In any implementation, in the cross-section of the positive electrode film layer in the thickness direction of the electrode plate, an area percentage of particles whose particle size ranges from 1 μm to 5 μm ranges from 12% to 40%.

The area percentage of the particles whose particle size ranges from 1 μm to 5 μm in the cross-section of the positive electrode film layer in the thickness direction of the electrode plate is within the foregoing range, which helps the battery maintain a high capacity, to further improve a phenomenon of rebounding of the electrode plate caused by a stress concentration easily occurring to large particles in the electrode plate, reduce a probability that the negative electrode film layer of the electrode plate contacts the positive electrode film layer and generates a short circuit, and further improve the cycle performance of the battery.

In any implementation, the vinylidene fluoride polymer includes one or more of polyvinylidene fluoride (PVDF) and a copolymer of vinylidene fluoride and hexafluoropropylene.

In any implementation, a single-side thickness of the positive electrode film layer ranges from 70 μm to 120 μm.

The gram capacities of the lithium-containing transition metal phosphate particles are relatively low. Researches indicate that when the single-side thickness of the positive electrode film layer is less than 70 μm, the battery capacity hardly satisfies market demands. The single-side thickness of the positive electrode film layer is within the foregoing range, which helps improve the capacity of the battery cell.

In any implementation, a single-side thickness of the positive electrode film layer ranges from 90 μm to 120 μm.

The single-side thickness of the positive electrode film layer is within the foregoing range, which helps further improve the capacity of the battery.

In any implementation, a single-side thickness of the positive electrode film layer ranges from 100 μm to 120 μm.

Increasing the single-side thickness of the positive electrode film layer is beneficial to improving the capacity of the battery. The applicant finds that when the single-side thickness of the positive electrode film layer is greater than or equal to 100 μm, the phenomenon of particle rebounding in the positive electrode film layer is more severe. According to the embodiments of this application, severe rebounding of a thick applied film layer in a stacked electrode assembly is effectively relieved, and the battery has improved cycle performance while maintaining a relatively high capacity.

In any implementation, the positive electrode film layer includes a first region, the first region is located at a top of the positive electrode film layer away from the positive current collector, a distribution uniformity of particles whose particle size is greater than or equal to 1 μm in the first region ranges from 0.2% to 5%.

In any implementation, the positive electrode film layer includes a first region, the first region is located at a top of the positive electrode film layer away from the positive current collector, a distribution uniformity of particles whose particle size is greater than or equal to 1 μm in the first region ranges from 0.2% to 3.5%.

A degree of stress concentration at a large particle and a degree of stress concentration at a small particle in the positive electrode film layer are different. As the stress is gradually released in a cycle process, different degrees of rebounding occur in the electrode plates. In this embodiment of this application, there is a particular content of large particles, and the large particles are uniformly distributed in the electrode plate, so that a pressing force of the positive electrode film layer to the separator is uniformly distributed, risks that local excessive pressing and local blocking of the lithium ion transmission path caused by uneven distribution of the large particles cause an increase in current density and easy lithium plating on the periphery are reduced, so that the cycle performance of the battery is further improved while the battery has a good capacity.

In any implementation, in the cross-section of the positive electrode film layer in the thickness direction of the electrode plate, in an area-weighted cumulative distribution curve of sphericity of particles whose particle size is greater than or equal to 1 μm, a median $L_{A50}$ of sphericity ranges from 0.6 to 0.8.

The median of the sphericity of the particles whose particle size is greater than or equal to 1 μm is within the foregoing range. Large particles have relatively good sphericity, particle bridging caused by irregular shapes of the large particles is reduced, void content in the electrode plates is reduced, stress concentration exacerbated by the irregular shapes of the large particles is reduced, and rebounding of the electrode plates caused by stress release in a cycle process is reduced, so that the battery cell has a high capacity and the cycle performance of the battery cell is further improved.

In any implementation, in the cross-section of the positive electrode film layer in the thickness direction of the electrode plate, in an area-weighted cumulative distribution curve of sphericity of particles whose particle size is greater than or equal to 1 μm, a median $L_{A50}$ of sphericity ranges from 0.65 to 0.75.

The median of the sphericity of the particles whose particle size is greater than or equal to 1 μm is within the foregoing range, which is beneficial to reducing stress concentration of large particles that is exacerbated by irregularity of the large particles, reducing rebounding of the electrode plates caused by stress release in a cycle process, and improving the cycle performance of the battery.

In any implementation, in the cross-section of the positive electrode film layer in the thickness direction of the electrode plate, in an area-weighted cumulative distribution curve of sphericity of particles whose particle size is greater than or equal to 1 μm, a median $L_{A50}$ of sphericity ranges from 0.67 to 0.75.

The median of the sphericity of the particles whose particle size is greater than or equal to 1 μm is within the foregoing range, so that stress concentration of large particles can be further improved, and rebounding of the electrode plates caused by stress release in a cycle process can be reduced, thereby further improving the cycle life of the battery cell.

In any implementation, in a cumulative distribution curve of a graphitization degree C. value obtained from the positive electrode film layer in an area mapping mode of a laser microscopic confocal Raman spectrometer, a median $C_{50}$ of the graphitization degree is greater than or equal to 0.95 and less than or equal to 1.20, the graphitization degree C. value is $I_G/I_D$, $I_G$ represents the intensity of the G band at 1580±100 $cm^{-1}$ in Raman spectra, and $I_D$ represents the intensity of the D band at 1350±100 $cm^{-1}$ in Raman spectra.

In a cumulative distribution curve of a graphitization degree C. value obtained from the positive electrode film layer in an area mapping mode of a laser microscopic confocal Raman spectrometer, a median $C_{50}$ of the graphitization degree is within the foregoing range, which can further improve the compaction density of the electrode plate, so that the content of large-sized particles in the positive electrode film layer can be reduced, thereby helping reduce, while maintaining the capacity of the battery, a rebounding phenomenon caused by excessive large particles in the film layer, and further improving the cycle performance of the battery.

In any implementation, in a cumulative distribution curve of a coating value B obtained from the positive electrode film layer in the area mapping mode of the laser microscopic confocal Raman spectrometer, a median $B_{50}$ of the coating value ranges from 0.30 to 0.60, the coating value B is $I_P/I_D$, $I_P$ represents the intensity of the P band at 948±100 $cm^{-1}$ in Raman spectra, and $I_D$ represents the intensity of the D band at 1350±100 $cm^{-1}$ in Raman spectra.

The median $B_{50}$ of the coating value of the positive electrode film layer is within the foregoing range, indicating that the surface carbon material layer of the positive electrode active material is relatively compact and uniform, which is beneficial to improving slip uniformity of the positive electrode film layer in a rolling process, and reducing a phenomenon of stress concentration in the positive electrode film layer. In addition, with the aid of the compact and uniform carbon material layer, the large particles in the positive electrode film layer can more easily slip in a compaction process, thereby reducing a stress concentration phenomenon at the large particles in the positive electrode film layer, reducing rebounding caused by stress release at the large particles in a cycle process, and improving the cycle life of the battery.

In any implementation, an iron dissolution rate of the positive electrode material ranges from 658 ppm to 1921 ppm, and optionally ranges from 658 ppm to 1485 ppm.

The iron element dissolved from the positive electrode material is mainly derived from the lithium-containing transition metal phosphate particles of the positive electrode active material. An iron dissolution rate depends on the number of lattice defects in the lithium-containing transition metal phosphate particles in one aspect, and depends on the integrity and compactness of the surface carbon material layer of the positive electrode active material in the other aspect. A lower iron dissolution rate means fewer lattice defects in the lithium-containing transition metal phosphate particles, which helps to reduce corrosion of the lattice in a weak-acid environment. In addition, the carbon material layer on the surface of the positive electrode active material is more integral and compact, and therefore, dissolution of iron ions in a weak-acid environment is suppressed. The positive electrode material having the iron dissolution rate within the foregoing range has relatively few lattice defects and an integral and compact carbon material layer, which helps improve the compression resistance and slippage ease degree of the particles in the positive electrode film layer under large rolling pressure, improves the compaction density of the positive electrode film layer, reduces the stress concentration in the positive electrode film layer, and improves the rebounding phenomenon of the large particles generated due to the stress concentration, so that the battery has a good capacity, thereby further improving the cycle performance of the battery.

In any implementation, the lithium-containing transition metal phosphate particles in the positive electrode film layer include a component shown in the following general formula: $Li_mFe_xP_yO_jQ_q$ Formula I, where Q includes one or more of Al, Na, K, Mg, Cu, Mn, Cr, Zn, Pb, Ca, Co, Ni, Sr, Nb, V, Ti, B, S, Si, N, F, Cl, Br, $0.8 \le m \le 1.15$, $0.9 \le x \le 1$, $0.95 \le y \le 1$, $3.5 \le j \le 4$, and $0 \le q \le 0.1$.

In any implementation, the lithium-containing transition metal phosphate particles include titanium, and based on a total mass of the lithium-containing transition metal phosphate particles in the positive electrode film layer, a mass content of titanium ranges from 500 ppm to 8000 ppm, and optionally ranges from 1000 ppm to 3000 ppm.

To introduce titanium into the lithium-containing transition metal phosphate particles, a titanium source needs to be added in a process of preparing the positive electrode active material. The titanium source is usually an inert material, and can achieve the functions of reducing reactivity and suppressing particle dimension growth after being adhered to the surface of the lithium-containing transition metal phosphate particle raw material. Increasing the graphitization degree of the positive electrode active material usually requires a relatively high sintering temperature or a relatively long sintering time. However, this also increases the size of the particles in the positive electrode film layer, increases stress concentration of the positive electrode film layer, and increases rebounding of the electrode plate in a cycle process. According to this embodiment of this application, a high-content titanium element is added to the lithium-containing transition metal phosphate particles, so that the reaction activity of the synthetic raw material of the positive electrode active material is reduced, the percentage of large particles is controlled while the positive electrode active material has a high degree of graphitization, stress concentration of the positive electrode film layer is reduced, and a rebounding phenomenon generated on the large particles due to the stress concentration is improved. Therefore, the battery has a good capacity, thereby further improving the cycle performance of the battery.

In addition, the doping of titanium in the positive electrode active material is conducive to inducing lattice distortion and reducing Li—O bond energy, thereby increasing the transport rate of lithium ions, and improving the dynamic performance of the battery. Uneven diffusion of the lithium ions in the positive electrode film layer is usually accompanied with a significant lithium ion concentration gradient. In this embodiment of this application, a high-content titanium element is added to the lithium-containing transition metal phosphate particles to improve a solid-phase transport rate of the positive electrode active material, thereby alleviating a dynamic problem of the battery.

In any implementation, the lithium-containing transition metal phosphate particles include vanadium, and based on the total mass of the lithium-containing transition metal phosphate particles in the positive electrode film layer, a mass content of vanadium ranges from 500 ppm to 5000 ppm, and optionally ranges from 500 ppm to 3000 ppm.

Vanadium in the positive electrode film layer can exist in multiple valence states. +5-valent vanadium ($V^{5+}$) can be doped at phosphorus sites, and can induce lattice distortion due to its large radius, expanding lithium-ion diffusion channels, thereby improving the ion conductivity of the positive electrode active material, and improving the dynamic performance of the battery. +3-valent vanadium ($V^{3+}$) may be doped at transition metal sites, generating lithium vacancies through charge compensation, thereby improving the electron conductivity of the positive electrode active material. In addition, the distribution uniformity of vanadium in the lithium-containing transition metal phosphate particles is improved, which is conducive to further improving the dynamic performance of the positive electrode film layer and the reaction uniformity of the positive electrode film layer, thereby further improving the dynamic performance and the cycle performance of the battery cell.

The mass content of the vanadium element being within the foregoing range helps to improve the dynamic performance of the positive electrode plate, and improve the dynamic performance of the lithium-containing transition metal phosphate battery. In addition, synergy between the titanium element, the vanadium element, and the carbon nanotube in the positive electrode film layer helps form a good three-dimensional network, and further improve electronic conductivity and ionic conductivity of the positive electrode film layer, thereby further improving the dynamic performance of the lithium-containing transition metal phosphate battery.

In any implementation, the positive electrode film layer further includes a conductive agent, and based on a total area of the cross-section of the positive electrode film layer in the thickness direction of the electrode plate, a total area percentage of agglomeration regions of the conductive agent ranges from 0.2% to 6%, and optionally ranges from 1.5% to 5%.

That a total area percentage of agglomeration regions of the conductive agent based on a total area of the cross-section of the positive electrode film layer in the thickness direction of the electrode plate is within the foregoing range indicates that the conductive agent in the positive electrode film layer is uniformly dispersed, and is easy to form a uniform conductive network, which helps to reduce a problem of local polarization and even lithium plating generated in the battery during a cycle process.

In addition, research shows that large-sized particles in the lithium-containing transition metal phosphate particles easily rebound, and that the agglomeration area of the conductive agent is within the foregoing range can suppress rebounding of the lithium-containing transition metal phosphate particles with the aid of even distribution of the conductive agent, so that mechanical binding is formed on the particles and even the film layer, the cohesion of the film layer is improved, the damage of the SEI film and the film layer in a rebounding process of the film layer is reduced, and the cycle life of the battery is improved.

In any implementation, the conductive agent includes carbon nanotubes, the carbon nanotubes include one or more of single-walled carbon nanotubes, few-walled carbon nanotubes, and multi-walled carbon nanotubes, and optionally, the conductive agent further includes conductive carbon black.

The carbon nanotube has a high aspect ratio, which is beneficial to overlapping between a plurality of positive electrode particles in the thickness direction, forms a long-range conductive path and improves a binding force between the particles, reduces a problem of local polarization and even lithium plating that is generated in a battery during a cycle process, and improves the cycle life of the battery. In addition, through a binding effect, a rebounding phenomenon of large particles in the positive electrode film layer can be reduced, thereby improving the cycle performance of the battery.

Conductive carbon black has a small size, attaches to the surfaces of the positive electrode particles and fills voids of the positive electrode particles, and forms dense dotted-like conductive contact. The matched use of the conductive carbon black and the carbon nanotube helps to further improve the conductive network in the positive electrode film layer while considering both long-range electrical conduction and short-range electrical conduction. In addition, the conductive agent has a large specific surface area, which is beneficial to liquid wicking and liquid retention, can reduce a phenomenon of extrusion of the electrolyte solution that is caused by a high expansion force increase during a long cycle process of the electrode plate, and improve the long cycle life of the battery.

In any implementation, the agglomeration regions of the conductive agent include carbon nanotubes and conductive carbon black.

Researchers find that carbon nanotubes are prone to an agglomeration phenomenon due to the high surface energy of carbon nanotubes. As a result, the dispersion of carbon nanotubes in the positive electrode film layer is nonuniform, and an effective network structure of carbon nanotubes fails to be formed. The surface energy of the conductive carbon black is relatively close to that of the carbon nanotubes, and can be adsorbed to the surface of the carbon nanotubes to form a physical barrier, thereby increasing the agglomeration resistance of the carbon nanotubes, reducing direct contact between the carbon nanotubes, so as to suppress the agglomeration phenomenon, and improving the distribution uniformity of the carbon nanotubes in the positive electrode film layer. In an aspect, this helps to improve the conductivity of the positive electrode film layer and improve the dynamic performance of the battery. In the other aspect, this helps the carbon nanotubes to bind the positive electrode film layer, thereby reducing a risk of shedding of the positive electrode film layer, and further improving the dynamic performance and the cycle life of the battery. In addition, the agglomeration of carbon nanotubes in the agglomeration regions of the conductive agent further leads to congestion in a localized ion transport path in the agglomeration regions of the conductive agent, and the combination with conductive carbon black can improve the lithium ion transport capability in the region, thereby reducing localized polarization, and further improving the cycle stability of the battery.

In any implementation, based on a mass of the positive electrode film layer, a mass content C1 of the carbon nanotubes meets: $0<C1\leq 2.5\%$, and a mass content C2 of the conductive carbon black meets: $0<C1\leq 2.5\%$.

The mass contents of the carbon nanotubes and the conductive carbon black are within the foregoing ranges, so that an agglomeration phenomenon of the carbon nanotubes can be effectively relieved and a good conductive network structure can be formed, thereby effectively alleviating a stress concentration of the positive electrode film layer, and improving a liquid retention rate of the positive electrode film layer in a long cycle process, further reducing a shedding risk and a polarization degree of the positive electrode film layer, improving the dynamic performance of the battery, and improving the cycle life of the battery.

In any implementation, the positive electrode film layer further includes a dispersant, and the dispersant includes hydrogenated nitrile butadiene rubber HNBR.

A polar group (for example, a cyano group, —CN) in the hydrogenated nitrile butadiene rubber HNBR may have an interaction (for example, a hydrogen bond or dipolar interaction) with a hydroxy group (—OH) on a surface of the lithium-containing transition metal phosphate particle or a site of a metal oxide, to enhance compatibility between the particle and the solvent, and reduce interfacial tension between the particle and the solvent, especially interfacial tension of large particles, so that the particles can be uniformly dispersed more easily, aggregation caused by hydrophobicity is reduced, the dispersibility of the large particles in the positive electrode film layer is improved, and stress concentration generated in a die cutting process of the positive electrode film layer is reduced.

In addition, when a film is formed by drying a slurry, the elastic network structure of the HNBR can buffer a shrinking stress generated due to the volatilization of the solvent, and reduce re-aggregation of the conductive agent due to a capillarity force in this process, thereby reducing an area percentage of an agglomeration region of the conductive agent, and improving a cycle life of the battery.

In any implementation, based on the mass of the positive electrode film layer, a mass content of the dispersant ranges from 0.5% to 2%.

The mass content of the dispersant is within the foregoing range, so that the particles in the positive electrode film layer can be uniformly dispersed while a high loading of the positive electrode film layer is maintained, and the battery has good capacity and cycle performance.

In any implementation, when the battery cell is in a fully-discharged state, a compaction density of the positive electrode plate ranges from 2.3 $g/cm^3$ to 2.6 $g/cm^3$.

In any implementation, a porosity of the positive electrode film layer ranges from 14% to 28%.

The porosity of the positive electrode film layer being within the foregoing range is beneficial to, in one aspect, improving a liquid retention feature of the electrolyte solution, improving ion diffusiveness of the positive electrode film layer having large particles of a particular area percentage, and improving dynamic performance of the battery.

In any implementation, a base coating layer is disposed in a bottom region of the positive electrode film layer close to the positive current collector, the base coating layer includes a conductive agent and a binder, the conductive agent includes carbon nanotubes and conductive carbon black, and the binder includes a vinylidene fluoride polymer.

In any implementation, a base coating layer is disposed in a bottom region of the positive electrode film layer close to the positive current collector, and a thickness of the base coating layer ranges from 0.5 μm to 5 μm.

The base coating layer provided in the embodiments of this application is conducive to improving the bonding force between the positive electrode film layer and the positive current collector and mitigating the phenomenon of stress concentration at large particles, thereby reducing a probability that the positive electrode film layer sheds off, and improving the cycle stability of the battery. In addition, compared with the direct contact between the positive current collector and the positive electrode film layer, the contact area between the base coating layer and the positive electrode film layer is increased, which is conducive to increasing an electron transport area between the current collector and the positive electrode film layer, thereby reducing the internal resistance of the electrode plate, and improving the dynamic performance of the battery.

In any implementation, a thickness of the base film ranges from 7 μm to 9 μm.

In any implementation, a single-side thickness of the ceramic layer ranges from 2 μm to 4 μm.

In any implementation, a single-side thickness of the bonding layer ranges from 1 μm to 5 μm.

The thickness of the bonding layer is excessively low, the space for buffering expansion in the separator is small, and the bonding force between the separator and the electrode plate is low. In one aspect, after the film layer expands, the stress increases, and a probability that the film layer sheds off increases, affecting the cycle life of the battery. In the other aspect, a probability that positive and negative electrodes overlap to cause short-circuit increases, thereby affecting safety performance of the battery. An excessively large thickness of the bonding layer causes a large space occupancy rate of the battery, thereby affecting the volume energy density of the battery. In this embodiment of this application, the thickness of the bonding layer is within the foregoing range, which helps to take the cycle life, safety performance, and the volume energy density of the battery into consideration.

In any implementation, the battery cell includes a housing, the stacked electrode assembly is accommodated in the housing, a dimension of the housing in a length direction is L0, a dimension of the housing in a width direction is W0, a dimension of the housing in the thickness direction is H0, 450 mm≤L0≤1300 mm, 100 mm≤W0≤150 mm, and 14 mm≤H0≤22 mm.

The size of the housing of the battery cell in this embodiment of this application is within the foregoing range, helping the battery to achieve a relatively good capacity.

In any implementation, the dimension L0 of the housing in the length direction meets: 450 mm≤L0≤650 mm.

The dimension L0 of the housing in the length direction satisfies 450 mm≤L0≤650 mm, the length of the battery cell is relatively short, which helps to shorten a current diffusion path and reduce internal resistance of the electrode plate, thereby reducing heat generation of the battery and improving dynamic performance of the battery. In addition, a relatively short housing length helps shorten a diffusion path of the electrolyte solution in an infiltration process, improves an infiltration rate and uniformity of the electrolyte solution, further promotes uniformity of de-intercalation of the lithium ions in a cycle process, relieves a stress concentration phenomenon, reduces a degree of rebounding of the film layer, and improves the cycle stability of the battery cell.

In any implementation, the dimension L0 of the housing in the length direction meets: 900 mm≤L0≤1300 mm.

When the dimension L0 of the housing in the length direction satisfies 900 mm≤L0≤1300 mm, the size of the battery cell is relatively long, which helps to reduce the volume percentage of the housing in the battery cell and improve the load percentage of the active material. In addition, the long battery cell can reduce the number of batteries required in a battery module, to simplify the structural design of the battery module, and reduce the number and complexity of the structural members in the module, thereby improving the space utilization of a battery pack, and further increasing the volumetric energy density of the battery cell.

In any implementation, the housing is made of a pouch-type material, and the pouch-type material includes an aluminum laminate composite film, and optionally, includes a composite film formed by aluminum and one or more of polypropylene (PP), polybutylene terephthalate (PBT), polybutylene succinate (PBS), nylon, polyethylene terephthalate (PET), and polyethylene (PE).

The pouch-type material has a relatively high elongation rate. Therefore, the housing of the pouch-type material is lighter, thinner, and softer, which helps improve space utilization of the battery cell, thereby improving the energy density of the battery cell. In addition, the high barrier property of the aluminum can effectively reduce infiltration of water and oxygen gas into the battery, and reduce decomposition of an electrolyte solution and an extent of oxidation of an electrode material, thereby improving the life of the battery.

In any implementation, the housing includes a first sealing zone, and the first sealing zone is disposed at at least one end of the stacked electrode assembly extending along the width direction; the first sealing zone includes a folded edge structure extending along the length direction, a sealing adhesive is disposed on the folded edge structure, and the sealing adhesive is continuously disposed in the length direction and secures the folded edge structure.

In this embodiment of this application, the first sealing zone includes the folded edge structure extending along the length direction, thereby further improving the sealing strength of the first sealing zone. Compared with discontinuous disposition of the sealing adhesive along the length direction, continuous disposition of the sealing adhesive along the length direction and fixing of the folded edge structure can further improve sealing strength, implement continuous hardening of the sealing zone in the length direction, and reduce a probability that the electrode plate punches open the sealing zone in the package in a cyclic rebounding process.

In any implementation, the housing includes at least one second sealing zone, the second sealing zone is disposed at at least one end of the stacked electrode assembly extending along the length direction of the housing, and the second sealing zone is disposed on a tab side of the stacked electrode assembly.

The second sealing zone is disposed on the tab side. The tab needs to be connected to a leading-out member. Connection strength between the leading-out member and the housing material is relatively weak, so that the gas easily rushes out from the second sealing zone. This is beneficial to implementing directional pressure release of the battery, reducing impact on an adjacent electrode assembly during thermal runaway, and improving the entire service life of the battery.

In any implementation, an outer periphery of the stacked electrode assembly is provided with a plurality of adhesive rings surrounding along the width direction, and the adhesive rings surrounding along the width direction are disposed at intervals along the length direction.

The adhesive rings surrounding the width direction of the electrode assembly are arranged at intervals in the length direction, which helps to fix positions of the electrode plates in the electrode assembly, reduce a probability of displacement of the electrode assembly in a shaking process of the battery, is especially applicable to a battery having a relatively large length, and can effectively reduce mutual displacement between the electrode plates in the length direction to cause a phenomenon of lithium plating, helping to keep a stable spatial structure of the battery, so that normal operation of the battery is not affected.

In any implementation, at 25° C., a capacity of the battery cell ranges from 100 Ah to 300 Ah, optionally ranges from 110 Ah to 190 Ah, and further optionally, ranges from 125 Ah to 180 Ah.

According to the battery cell in this embodiment of this application, the stacked electrode assembly is accommodated by using an appropriate housing size, and a film layer of the positive electrode plate in the stacked electrode assembly is controlled to have a reasonable percentage of large particles, so that the battery cell has a relatively high capacity.

A second aspect of the present application provides a battery apparatus, including the battery cell provided in the first aspect of the present application.

A third aspect of the present application provides a power consuming apparatus. The power consuming apparatus includes the battery apparatus according to the second aspect. The battery apparatus is configured to supply electrical energy.

A fourth aspect of the present application provides an energy storage apparatus. The energy storage apparatus includes the battery apparatus according to the second aspect. The battery apparatus is configured to store electrical energy.

DESCRIPTION OF REFERENCE NUMERALS

Figures 1, 2:
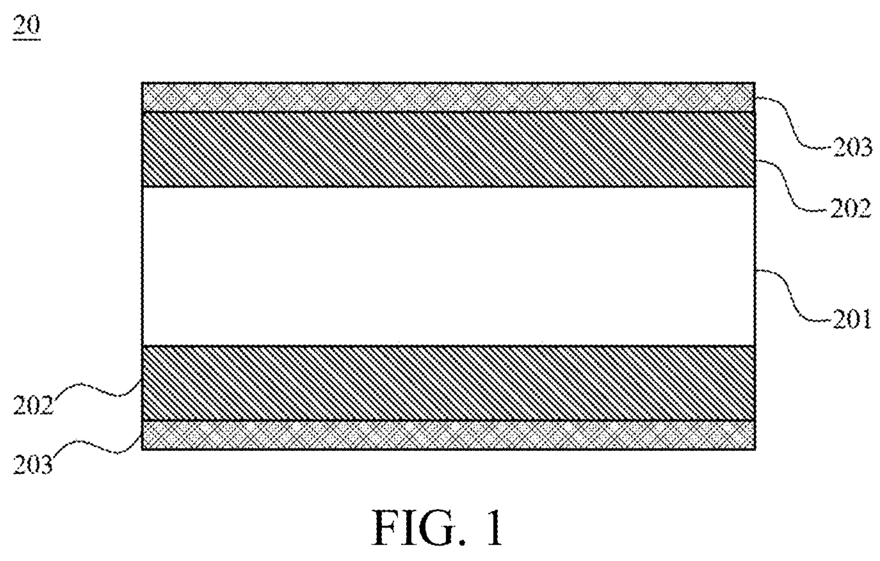
FIG. 1 is a schematic diagram of a separator according to an implementation of the present application.
FIG. 2 is a schematic diagram of a separator according to the related art.

10: positive electrode plate; 101: positive current collector; 102: positive electrode film layer; 102*a*: first surface; 102*b*: second surface; 1021: first region; 20: separator; 201: base film; 202: ceramic layer; 203: bonding layer; 5: battery cell; 50: housing; 51: first sealing zone; 52: second sealing zone; 53: leading-out member; X: length direction; Y: width direction; and Z: thickness direction.

DETAILED DESCRIPTION

Hereinafter, embodiments of an electrolyte solution, a battery cell, a battery apparatus, a power consuming apparatus, and an energy storage apparatus of this application are specifically disclosed in the detailed description with appropriate reference to the accompanying drawings. However, there may be situations where unnecessary detailed explanations are omitted. For example, there are situations where detailed explanations of well-known matters are omitted and repeated explanations of the same structure are actually provided. Thus, the following description does not become unnecessarily lengthy, which facilitates the easy comprehension of those skilled in the art. In addition, the accompanying drawings and the following explanations are provided for those skilled in the art to fully understand this application and are not intended to limit the subject matter recorded in the claims.

The "scope" disclosed in this application is limited in the form of a lower limit and an upper limit. The given scope is limited by selecting a lower limit and an upper limit, and the selected lower limit and upper limit define the boundary of the special scope. The range defined in this way may include or exclude end values, and may be arbitrarily combined, that is, any lower limit can be combined with any upper limit to form a range. For example, if ranges of 60-120 and 80-110 are listed for a particular parameter, it is to be understood that ranges of 60-110 and 80-120 are also expected. In addition, if the minimum range values 1 and 2 are listed, and if the maximum range values 3, 4, and 5 are listed, the following ranges can all be expected: 1-3, 1-4, 1-5, 2-3, 2-4, and 2-5. In this application, unless otherwise specified, the numerical range "a to b" represents an abbreviated representation of any combination of real numbers between a and b, where a and b are both real numbers. For example, the numerical range "0-5" means that all real numbers between 0-5 are listed herein, and "0-5" is merely an abbreviated representation of the combination of these numbers. In addition, when a parameter is expressed as an integer ≥2, it is equivalent to disclosing that the parameter is, for example, an integer of 2, 3, 4, 5, 6, 7, 8, 9, 10, 11, 12, or the like.

Unless otherwise specified, all the embodiments and optional embodiments of this application can be combined with each other to form new technical solutions, and such technical solutions should be considered to be included in the disclosure of this application.

Unless otherwise specified, all the technical features and optional technical features of this application can be combined with each other to form new technical solutions, and such technical solutions should be considered to be included in the disclosure of this application.

Unless otherwise specified, all the steps in this application can be performed in the order described or in random order, and preferably in the order described. For example, the method includes steps (a) and (b), meaning that the method may include steps (a) and (b) performed sequentially, or may include steps (b) and (a) performed sequentially. For example, reference to "the method may further include step (c)" indicates that step (c) may be added to the method in any order, e.g., the method may include steps (a), (b) and (c), or steps (a), (c) and (b), or steps (c), (a) and (b), or the like.

In this application, the term "a plurality of" or "a plurality of types of" indicates two or more.

Unless otherwise specified, the terms used in this application have well known meanings as commonly understood by a person skilled in the art.

Unless otherwise stated, the values of the parameters mentioned in this application can be measured by various test methods commonly used in the art, for example, can be measured according to the test methods given in the embodiments of this application. Unless otherwise specified, the test temperature of the parameters is 25° C.

In the embodiments of this application, a battery apparatus may include one or more battery cell assemblies, configured to supply voltage and capacity. The battery cell assembly may include a plurality of pouch-type battery cells. The plurality of pouch-type battery cells are connected in series, in parallel, or in series-parallel through a bus component. For example, the battery cell assembly is usually formed by arranging the plurality of pouch-type battery cells. The battery cell assembly may be a battery module. The battery module is an independent module formed by arranging and securing the plurality of pouch-type battery cells. For example, the battery module may be formed by tying the plurality of battery cells through a strap.

The battery apparatus may be a battery pack. The battery pack includes a box body and one or more battery cell assemblies. The battery cell assembly is accommodated in the box body. The battery cell assembly may be a battery module. The battery cell assembly may be accommodated in the box body by securing the battery module in the box body. The battery cell assembly may alternatively be accommodated in the box body by directly securing the plurality of pouch-type battery cells in the box body.

In the embodiments of this application, the box body may include a first box body and a second box body. The first box body and the second box body are snapped to form a sealed space inside the box body to accommodate the battery cell assembly. The "sealed" means "covered" or "closed", or may be hermetic, or may be non-hermetic. The first box body may be a top cover or a bottom plate. For example, the box body may include a top cover, a frame, and a bottom plate. The top cover and the bottom plate are connected to the frame to form a sealed space inside the box body to accommodate the battery cell assembly.

In the embodiments of this application, the box body may be used as a part of the chassis structure of a vehicle. For example, a part of the box body may serve as at least a part of the floor of a vehicle, or a part of the box body may serve as at least a part of the cross beam and longitudinal beam of a vehicle.

In the embodiments of this application, the battery cell may be a secondary battery. The secondary battery is a battery cell whose active material can be activated for continuous use through charging after the battery cell is discharged. The battery cell may be a lithium ionic battery. The battery cell may be flat-shaped.

A battery mentioned in embodiments of this application may be a single physical module including one or more battery cells to provide a higher voltage and a higher capacity. For example, the battery provided in this application may include a battery cell, a battery module, a battery pack, or the like.

The battery cell is the smallest unit constituting the battery, and can achieve functions of charging and discharging independently. When a plurality of battery cells are provided, the plurality of battery cells are connected in series, in parallel, or in series-parallel through a bus component. In some embodiments, the battery may be a battery module. When a plurality of battery cells are provided, the plurality of battery cells are arranged and fastened to form one battery module. In some embodiments, the battery may be a battery pack. The battery pack includes a box body and battery cells. The battery cells or the battery module is accommodated in the box body. In some embodiments, the box body may be used as a part of the chassis structure of a vehicle. For example, a part of the box body may serve as at least a part of the underbody of a vehicle, or a part of the box body may serve as at least a part of the cross beam and longitudinal beam of a vehicle.

In some embodiments, the battery may be an energy storage apparatus. The energy storage apparatus includes an energy storage container, an energy storage cabinet, and the like.

In some embodiments, the battery cell may be assembled into a battery module, the battery module may include a plurality of battery cells, and a specific quantity of battery cells may be adjusted according to the application and capacity of the battery module. In some embodiments, the battery modules may further form a battery pack, and a quantity of battery modules included in the battery pack may be adjusted based on the application and capacity of the battery pack.

The battery cell includes an electrode assembly and an electrolyte.

The electrode assembly usually includes a positive electrode plate and a negative electrode plate. The negative electrode plate is an electrode at which reactions occur to absorb or lithiate lithium ions during charging and release lithium or delithiate lithium during discharging. The positive electrode plate is an electrode at which reactions occur to release lithium ions or delithiate lithium during charging and absorb or lithiate lithium during discharging.

Compared with a lithium-containing transition metal oxide material, a lithium-containing transition metal phosphate material has advantages such as high safety, a long cycle life, low costs, and stable high-temperature performance. However, the lithium-containing transition metal phosphate material has a low gram capacity, which is not beneficial to improvement of a battery capacity. The applicant finds through research that the stacked electrode assembly does not have a corner area compared with the rolled electrode assembly, and therefore, space utilization of the internal volume of the battery is higher. Using the stacked electrode assembly is beneficial to further improving the volume energy density of the battery. In addition, a particular content of large particles is beneficial to increasing the grading of the film layer, improving the compaction density of the electrode plate, and further increasing the volume energy density of the battery. However, the stacked electrode assembly has a higher capacity due to absence of the corner area in the rolled electrode assembly, but lacks a radial binding force. Consequently, the shearing force of the interface between the positive and negative electrode films and the separator is relatively weak, and relative sliding easily occurs under a long cycle or mechanical shock, increasing a risk of short circuit. In addition, large particles in the film layer tend to generate a stress concentration in a compaction process of the electrode plates, and the stress is gradually released in a cycle process, so that the film layer rebounds. When the stacked electrode assembly lacks an external binding force, the film layer rebounds, more easily causing misplacement between the positive and negative electrode plates and the separator, further increasing a local short circuit risk of the battery, and worsening the cycle performance of the battery. How to obtain a battery having both good capacity and cycle performance is a technical problem that needs to be resolved urgently in the art.

A first aspect of this application provides a battery cell. The battery cell includes a stacked electrode assembly, where the stacked electrode assembly includes a positive electrode plate, a negative electrode plate, and a separator disposed between the positive electrode plate and the negative electrode plate; the positive electrode plate includes a positive current collector and a positive electrode film layer disposed on at least one side of the positive current collector, the positive electrode film layer includes lithium-containing transition metal phosphate particles, and at least a portion of a surface of the lithium-containing transition metal phosphate particles is provided with a carbon material; in a cross-section of the positive electrode film layer in a thickness direction of the electrode plate, an area percentage of particles whose particle size is greater than or equal to 1 μm ranges from 12% to 50%; and the structure of the separator is shown in FIG. 1, the separator 20 includes a base film 201, a ceramic layer 202 disposed on each of two sides of the base film 201, and a bonding layer 203 disposed on a side of the ceramic layer 202 at least close to a side of the positive electrode plate away from the base film 201, the bonding layer 203 is a continuous layer with a porous structure, and the bonding layer 203 includes a vinylidene fluoride polymer.

The applicant finds that, when an area percentage of particles whose particle size is greater than or equal to 1 μm in a cross-section of the positive electrode film layer in a thickness direction of the electrode plate is less than 12%, insufficient particle grading significantly limits space for increasing a compaction density, making it difficult to effectively improve a battery capacity. However, when an area percentage of particles whose particle size is greater than or equal to 1 μm in a cross-section of the positive electrode film layer in a thickness direction of the electrode plate is greater than 50%, excessive large particles cause a severe rebound phenomenon in the positive electrode film layer, causing SEI film breakage and film layer splitting, increasing a short circuit risk, and negatively affecting the cycle performance of the battery.

According to this embodiment of this application, a stacked electrode assembly is matched with a lithium-containing transition metal phosphate positive electrode film layer having a particular content of large particles to improve the battery capacity, a separator provided with a ceramic layer on each of both sides is further used, to improve the stiffness of the separator, and a separator having continuous layers with a porous structure and having a larger bonding area and a stronger bonding force is used, to increase the bonding function between the separator and the positive electrode plate, improve the compactness and the stiffness of a group inside the stacked electrode assembly, make up for deficiency of a small external binding force of the stacked electrode assembly, reduce the risk that mutual pressing in the thickness direction of the positive and negative electrode plates become misplaced horizontally in a process of rebounding of the electrode assembly, and reduce the risk that the positive and negative electrode overlap and further cause a short circuit, so that the cycle performance of the battery is further improved on the basis of a good capacity of the battery.

In this application, the stacked electrode assembly refers to an electrode assembly formed by stacking a positive electrode plate, a separator, and a negative electrode plate.

In this application, the positive electrode film layer includes the lithium-containing transition metal phosphate particles. However, the positive electrode film layer does not merely refer to the positive electrode active material layer, and other film layers such as a base coating layer and a liquid retention layer that are connected to the positive electrode active material layer and that are distinguished difficultly are collectively referred to as positive electrode film layers.

The lithium-containing transition metal phosphate refers to a phosphate material including a lithium element and a transition metal element, and may be detected in any well-known manner in the art. For example, the lithium-containing transition metal phosphate may be detected by using a combination of an X-ray diffractometer (XRD), an energy spectrum analyzer, and an inductively coupled plasma mass spectrometer.

In the present application, the term "particle" refers to a particle whose complete boundary can be identified in the field of view of the positive electrode film layer at a magnification, for example, 10 thousand times. A defect or a scratch may exist in the particle, but a complete boundary sufficient for dividing the particle cannot be identified in the particle.

The particle identification method is specifically as follows: segmenting the positive electrode film layer in the electrode plate thickness direction by using an argon ion beam (as an example, device model: Leica EM TIC 3X CP, working voltage: 6 kV, and working duration: 6 h may be selected), and after the cross section is exposed, observing the cross section of the positive electrode film layer in the electrode plate thickness direction by using a scanning electron microscope (as an example, device model: Hitachi SU8230, working voltage: 3 kV, beam current: high, and probe model: U(LA100), and working distance <5 mm may be selected). An image is collected by using a field emission scanning electron microscope in a secondary electron mode at a non-edge position (after an edge of an electrode plate is observed under the scanning electron microscope, a field of view is adjusted to a central part of a sample) in the cross section of the positive electrode film layer. An electron microscope image is captured at a magnification of 10 k times, and particles in the electron microscope image are analyzed by using ImageJ software (1.46r, win64 version). A method for using the ImageJ software is specifically as follows: A to-be-analyzed scanning electron microscope image is loaded; the Cellpose plug-in software therein is used to identify a particle, and manual calibration is performed based on the particle; and Image J is used to read and collect statistics on data. A specific method for identifying a particle by using the Cellpose plug-in software is as follows: A segmentation diameter parameter (diameter in the Segmentation module) is set to 15 pixels, and "run cyto3" is clicked to perform particle identification; and then a particle that cannot be identified by the software, that cannot be completely identified by the software, or that is identified to have an error in the image is manually identified. A particle that cannot be identified by the software, that cannot be completely identified by the software, or that is identified to have an error in the image includes the following types: 1. Because the particle is excessively large or the particle has a scratch on a surface, the particle cannot be identified or cannot be completely identified. 2. During the segmentation of the argon ion beam, a scratch may be generated on a surface of the particle, and during an identification process, the software may incorrectly determine the scratch as a particle boundary, thereby generating an identification error. 3. Because the particle is excessively small, the particle is not successfully identified. 4. The particle is located at an edge of a field of view of an electron microscope, the inside of the particle is intersected by the edge, a topography cannot be completely presented, and a local part instead of an entire part is identified, causing an identification error. The foregoing particle that is not identified or has an identification error is manually calibrated, and a specific process is as follows: deleting a large particle that fails to be completely displayed and that is located at a peripheral edge of the scanning electron microscope; determining whether there is a gap scratch in another particle that is not identified or has an identification error, and if there is no gap scratch in the particle, determining that the particle is a particle, and manually identifying the particle according to a particle boundary observed manually; and determining, in response to that there is a gap scratch inside the particle, whether the gap scratch penetrates through the particle, and determining, if the gap scratch does not penetrate through the particle, that the gap scratch is a particle, and performing manual identification; and determining, in response to that the gap scratch runs through the particle, whether the gap scratch is linear or in an irregular shape; determining, in response to that the gap scratch is in an irregular shape, that the gap scratch is a boundary between particles, and performing particle division along the boundary; in response to that the gap scratch is linear, performing contrast comparison; in response to that the contrast comparison is not significant and there is no crack feeling, determining that the gap scratch is a scratch, and identifying the gap scratch as a particle; and determining, in response to that the contrast comparison is strong and has a crack feeling, the gap scratch as a boundary between particles, and identifying the gap scratch as two particles. Information unrelated to particles in an automatic processing process of the image is deleted after the manual identification, that is, determining and identification of the particles in the image are completed.

The area percentage of the particles whose particle size is greater than or equal to 1 μm in the cross-section of the positive electrode film layer in the thickness direction of the electrode plate can directly reflect the percentage relationship between the partial particle area of the particle size segment and the whole particle area, to reflect the area of the particles in the particle size segment.

It may be understood that, particles in a cross section of the positive electrode film layer in an electrode plate thickness direction, especially particles above 50 nm, mainly originate from the positive electrode active material. Therefore, in this embodiment of the present application, through observation and statistics collection on the areas of the particles in the cross section of the positive electrode film layer in the electrode plate thickness direction, a distribution status of the lithium-containing transition metal phosphate particles in the positive electrode film layer can be accurately and objectively reflected.

In the existing technology, statistics on the particle size of the positive electrode active material is usually collected through a Malvern laser diffraction method by using a laser particle size analyzer. However, researches of the applicant indicate that because the lithium-containing transition metal phosphate particles are prone to agglomeration, a particle size of a particle agglomerate thereof is usually measured by using a test result obtained by using a Malvern laser diffraction method according to a laser scattering principle, and cannot truly reflect particle sizes of the particles in the positive electrode active material, and even cannot reflect a dispersion state of the positive electrode active material in the film layer, because a dispersion degree of the positive electrode active material in the film layer increases in slurrying, film forming, and rolling processes. The test result obtained through the Malvern laser diffraction method is affected by the particle size, the specific surface area, and the agglomeration degree of the positive electrode active material. Compared with a true dispersed case in the electrode plate, the quantity of large particles obtained through the test is lower than an actual value, and the quantity of small particles obtained through the test is higher than an actual value. Therefore, the particle size obtained through the test with the Malvern laser Diffraction method cannot be equivalent to or analogized to the particle size obtained through statistics collection in this embodiment of the present application.

A test method for the area percentage of the particles whose particle size is greater than or equal to 1 μm in the cross-section of the positive electrode film layer in the thickness direction of the electrode plate is specifically as follows: The particles in the cross section of the positive electrode film layer in the electrode plate thickness direction are identified with reference to the method described above in this application, an image obtained after particle determining and identification are completed is imported into the ImageJ software for analysis, setting of a scale is completed according to a scanning electron microscope image, and a particle size, an area, a sphericity, and roughness of a particle in a cross section of the positive electrode film layer in an electrode plate thickness direction are statistically analyzed by using "Feret", "Area", "Round", and "Solidity" analysis functions. According to a software manual (ImageJ User Guide IJ 1.46r), the parameter "Feret" obtained through analysis represents a maximum distance between all parallel lines in the two-dimensional projection of the particle, and the maximum distance represents the particle size of the particle; and an "Area" parameter obtained represents a pixel area of a particle. Particles having particle sizes of less than 50 nm have a relatively large error in a statistical process, and are difficult to be accurately identified. In addition, the particle size of the conductive agent is generally less than 50 nm, and a relatively large error may be generated to a statistical result. Therefore, none of particles having particle sizes of less than 50 nm is counted in the particle size statistical process of the present application, and particle statistics data corresponding to a case that Area, Round, or Solidity is displayed as "NaN" is deleted. A sum of "Area" parameters of the particles whose particle size is greater than or equal to 1 μm and a sum of "Area" parameters of all the particles are calculated and respectively used as an area of the particles whose particle size is greater than or equal to 1 μm and a statistical total area of the particles. The sum of the areas of the particles whose particle size is greater than or equal to 1 μm divided by the statistical total area of the particles is the area percentage of the particles whose particle size is greater than or equal to 1 μm in the cross-section of the positive electrode film layer in the thickness direction of the electrode plate.

In some implementations, the area percentage of the particles whose particle size is greater than or equal to 1 μm in the cross-section of the positive electrode film layer in the thickness direction of the electrode plate is optionally 12%, 12.02%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 34.78%, 34.95%, 35%, 36%, 36.29%, 36.37%, 36.64%, 36.88%, 37%, 38%, 38.09%, 38.44%, 39%, 40%, 41%, 42%, 43%, 44%, 45%, 46%, 47%, 48%, 49%, 49.96%, or 50%, or in a value range between any two thereof.

In some implementations, the vinylidene fluoride polymer includes one or more of polyvinylidene fluoride (PVDF) and a copolymer of vinylidene fluoride and hexafluoropropylene.

As shown in FIG. 2, in the existing technology, a water-based PVDF is usually used for a bonding layer of a separator, and usually presents an island-shaped structure in the separator. This is beneficial to providing gaps for expansion of the electrode assembly, and is convenient for manufacturing. However, such a bonding layer of the separator has a low bonding area and a relatively weak bonding force.

Figures 3, 4:
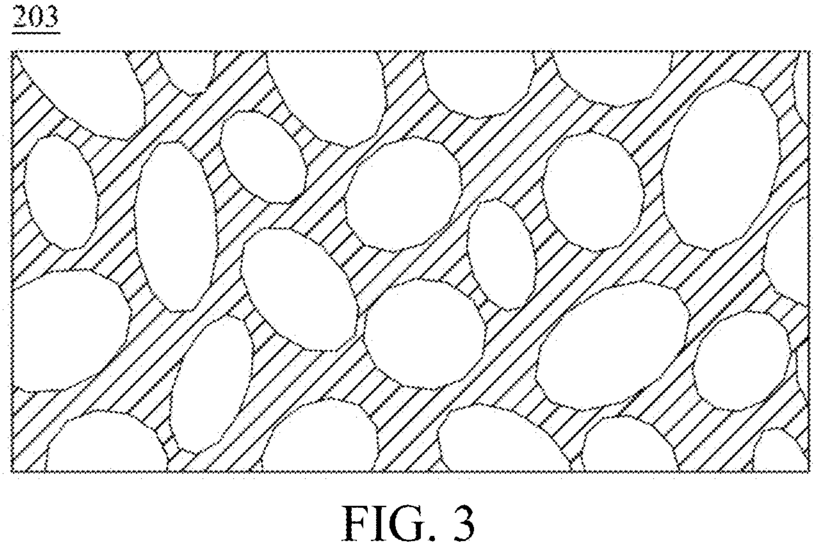
FIG. 3 is a schematic diagram of surface topography of a bonding layer of a separator according to an implementation of this application.
FIG. 4 is a schematic diagram of a positive electrode plate according to an implementation of the present application.

FIG. 3 is a schematic diagram of surface topography of a bonding layer 203 of a separator according to an embodiment of this application. The bonding layer of the separator according to this embodiment of this application has a certain porous structure in a continuous structure of the bonding layer, and the ceramic layer disposed between the base film and the bonding layer can be observed through the porous structure. It may be understood that when a continuous layer having a porous structure is used as the bonding layer, the bonding layer may be in contact with the positive electrode plate or the negative electrode plate or may be pressed under force during a process of manufacturing or cycling an electrode plate, and therefore, the bonding layer may be in a lumpy form. The continuous layer mentioned in this application does not require that the bonding layer is continuous in the entire battery. Instead, the continuous layer refers to a continuous layer that is of a uniform and porous structure instead of an island-shaped structure at a micro-level, for example, when observed under a microscope. To feed back a real topography of the separator, during sampling, sampling is preferably performed on an area in the battery in which a bonding layer of the separator and the positive electrode plate or the negative electrode plate are less frequently bonded. As an example, sampling is performed at a position on the separator projecting beyond the positive electrode plate and the negative electrode plate. Alternatively, sampling is performed on the separator close to a surface of the electrode assembly. Therefore, the separator obtained through sampling can better reflect an actual state of the separator.

For the separator provided in this embodiment of this application, a continuous layer of a porous structure is used as a bonding layer, and has a larger binding area compared with an island-shaped bonding layer in the existing technology, so that the separator is more strongly and uniformly bonded to the positive electrode film layer. In addition, through the porous structure in the bonding layer, both the efficiency of transmitting lithium ions and the dynamic performance of the battery can be considered. Compared with a rolled cell, a compression force between electrode plates is small in an electrode assembly preparing process for the stacked electrode assembly. The lithium-containing transition metal phosphate particle whose particle size is greater than or equal to 1 μm may damage the SEI film and the electrode plate film layer in a process of rebounding. In addition, mutual pressing in a thickness direction of the positive and negative electrode plates easily causes a relative misplacement in a horizontal direction of the positive and negative electrode plates. Ceramic layers are disposed on both sides of the separator provided in this embodiment of this application, and a continuous layer of a porous structure is used as a bonding layer. This is especially applicable to a stacked electrode assembly, helping to reduce a rebounding phenomenon of the stacked electrode assembly during a long-cycle process and improve maintenance of a battery capacity during the long-cycle process.

According to this embodiment of this application, the continuous layer of the porous structure is used as the bonding layer, to improve the bonding force between the separator and the electrode plate and maintain the air permeability and the porosity of the separator, thereby improving the stability of the electrode plate, further reducing the risk of internal short circuit caused by rebounding of the electrode plate, and improving the cycle stability of the battery.

In some implementations, the material of the base film may include, but is not limited to, one or more of glass fiber, non-woven cloth, polyethylene (PE), and polypropylene (PP).

In this application, the ceramic layer includes ceramic particles, and the ceramic particles include one or more of $Al_2O_3$, AlO(OH), $SiO_2$, $TiO_2$, MgO, CaO, $ZnO_2$, $ZrO_2$, and $SnO_2$.

Ceramic particles exhibit flame retardancy and high hardness values, demonstrating minimal deformation under thermal stress, thereby exhibiting excellent dimensional stability. Ceramic layers being disposed on two sides of the base film is beneficial to improving the stiffness of the battery, reducing rebounding of the electrode plate, and reducing a probability that the negative electrode film layer is in contact with the positive electrode film layer to generate a short circuit in a process of the rebounding of the electrode plate.

In some implementations, in the cross-section of the positive electrode film layer in the thickness direction of the electrode plate, an area percentage of particles whose particle size ranges from 1 μm to 5 μm ranges from 12% to 50%.

The area percentage of the particles whose particle size ranges from 1 μm to 5 μm in the cross-section of the positive electrode film layer in the thickness direction of the electrode plate is within the foregoing range, which helps the battery maintain a high capacity, thereby improving a phenomenon of rebounding of large particles in the electrode plate during a battery cycle, and improving the cycle performance of the battery.

In some implementations, in the cross-section of the positive electrode film layer in the thickness direction of the electrode plate, an area percentage of particles whose particle size ranges from 1 μm to 5 μm ranges from 12% to 40%.

The area percentage of the particles whose particle size ranges from 1 μm to 5 μm in the cross-section of the positive electrode film layer in the thickness direction of the electrode plate is within the foregoing range, which helps the battery maintain a high capacity, to further improve a phenomenon of rebounding of the electrode plate caused by a stress concentration easily occurring to large particles in the electrode plate, reduce a probability that the negative electrode film layer of the electrode plate contacts the positive electrode film layer and generates a short circuit, and further improve the cycle performance of the battery.

In some implementations, a single-side thickness of the positive electrode film layer ranges from 70 μm to 120 μm.

As shown in FIG. 4, a single-side thickness H of the positive electrode film layer is a distance from a first surface 102*a* of a positive electrode film layer 102 away from a positive current collector 101 to a second surface 102*b* disposed opposite to the first surface 102*a*. It should be noted that the positive electrode film layer includes the lithium-containing transition metal phosphate particles. However, the positive electrode film layer does not merely refer to the positive electrode active material layer, and other film layers such as a base coating layer and a liquid retention layer that are connected to the positive electrode active material layer and that are distinguished difficultly are collectively referred to as positive electrode film layers.

The thickness of the positive electrode film layer may be detected in any known manner in the art. As an example, the thickness of the positive electrode film layer in the cross section of the positive electrode plate along the thickness direction is measured by using a scanning electron microscope. Three different positions are randomly selected for measurement, and an average value is calculated, and is used as the thickness of the positive electrode film layer.

In some implementations, the single-side thickness of the positive electrode film layer is optionally 70 μm, 72.34 μm, 71 μm, 72 μm, 73 μm, 74 μm, 75 μm, 76 μm, 77 μm, 78 μm, 79 μm, 80 μm, 81 μm, 82 μm, 83 μm, 83.91 μm, 84 μm, 85 μm, 86 μm, 87 μm, 88 μm, 89 μm, 90 μm, 91 μm, 91.88 μm, 92 μm, 93 μm, 94 μm, 95 μm, 96 μm, 97 μm, 98 μm, 98.93 μm, 99 μm, 100 μm, 101 μm, 102 μm, 103 μm, 104 μm, 105 μm, 105.44 μm, 105.64 μm, 105.65 μm, 105.89 μm, 106 μm, 106.21 μm, 106.34 μm, 107 μm, 108 μm, 109 μm, 110 μm, 111 μm, 112 μm, 113 μm, 114 μm, 115 μm, 116 μm, 116.09 μm, 117 μm, 118 μm, 119 μm, or 120 μm, or in a value range between any two thereof.

The gram capacities of the lithium-containing transition metal phosphate particles are relatively low. Researches indicate that when the single-side thickness of the positive electrode film layer is less than 70 μm, the battery capacity hardly satisfies market demands. The single-side thickness of the positive electrode film layer is within the foregoing range, which helps improve the capacity of the battery cell.

In some implementations, a single-side thickness of the positive electrode film layer ranges from 90 μm to 120 μm.

The single-side thickness of the positive electrode film layer is within the foregoing range, which helps further improve the capacity of the battery.

In some implementations, a single-side thickness of the positive electrode film layer ranges from 100 μm to 120 μm.

Increasing the single-side thickness of the positive electrode film layer is beneficial to improving the capacity of the battery. The applicant finds that when the single-side thickness of the positive electrode film layer is greater than or equal to 100 μm, the phenomenon of particle rebounding in the positive electrode film layer is more severe. According to the embodiments of this application, severe rebounding of a thick applied film layer in a stacked electrode assembly is effectively relieved, and the battery has improved cycle performance while maintaining a relatively high capacity.

In some implementations, as shown in FIG. 4, the positive electrode plate 10 includes a positive current collector 101 and a positive electrode film layer 102 arranged on at least one side of the positive current collector 101. The positive electrode film layer 102 includes a first region 1021, the first region 1021 is located at a top of the positive electrode film layer 102 away from the positive current collector 101, a distribution uniformity of particles whose particle size is greater than or equal to 1 μm in the first region 1021 ranges from 0.2% to 5%, and optionally ranges from 0.2% to 3.5%.

In this application, the first region of the positive electrode film layer refers to a region located at the top of the positive electrode film layer away from the current collector. As an example, a region in a range at a thickness of 20 μm from the first surface 102*a* of the positive electrode film layer is recorded as the first region of the positive electrode film layer.

A method known in the art may be used for testing the distribution uniformity of the particles having the particle size of greater than or equal to 1 μm in the first region. As an example, a cross-sectional drawing of the positive electrode film layer along the thickness direction is acquired, a cross section of the first region of the positive electrode film layer is observed through a scanning electron microscope at a magnification of 3 k by using a method similar to that described above, the 3 k electron microscope image continues to be observed at a magnification of 10 k, 10 non-overlapping visual fields are selected, and 10 scanning electron microscope images are captured; the 10 captured scanning electron microscope images are separately imported into ImageJ software for analysis, and area percentages of particles whose particle size is greater than or equal to 1 μm in the 10 images are obtained by testing, and there are 10 values in total; and an extreme difference between the obtained 10 values is a distribution uniformity of particles whose particle size is greater than or equal to 1 μm in the first region, where the extreme difference is a difference between a maximum value and a minimum value of the 10 values. In the first region, a smaller distribution uniformity of particles whose particle size is greater than or equal to 1 μm indicates a more uniform distribution of large particles in the positive electrode film layer.

In some implementations, in the first region, a distribution uniformity of particles whose particle size is greater than or equal to 1 μm is optionally 0.2%, 0.3%, 0.4%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 1%, 2.1%, 2.2%, 2.3%, 2.4%, 2.5%, 2.6%, 2.7%, 2.8%, 2.9%, 1%, 3.1%, 3.2%, 3.3%, 3.4% 3.5% 3.6%, 3.7%, 3.8%, 3.9%, 1%, 4.1%, 4.2%, 4.3%, 4.4%, 4.5%, 4.6%, 4.7%, 4.8%, 4.9%, or 5%, or in a value range between any two thereof.

A degree of stress concentration at a large particle and a degree of stress concentration at a small particle in the positive electrode film layer are different. As the stress is gradually released in a cycle process, different degrees of rebounding occur in the electrode plates. In this embodiment of this application, there is a particular content of large particles, and the large particles are uniformly distributed in the electrode plate, so that a pressing force of the positive electrode film layer to the separator is uniformly distributed, risks that local excessive pressing and local blocking of the lithium ion transmission path caused by uneven distribution of the large particles cause an increase in current density and easy lithium plating on the periphery are reduced, so that the cycle performance of the battery is further improved while the battery has a good capacity.

In some implementations, in the cross-section of the positive electrode film layer in the thickness direction of the electrode plate, in an area-weighted cumulative distribution curve of sphericity of particles whose particle size is greater than or equal to 1 μm, a median $L_{A50}$ of sphericity ranges from 0.6 to 0.8.

A test method for the sphericity of the particles whose particle size is greater than or equal to 1 μm in the cross-section of the positive electrode film layer in the thickness direction of the electrode plate is specifically as follows: identifying the particles whose particle size is greater than or equal to 1 μm in the cross-section of the positive electrode film layer in the thickness direction of the electrode plate with reference to the method described above in this application; and analyzing the morphology of the particles in the cross section of the positive electrode film layer in the electrode plate thickness direction by using the analysis functions “shape description” in ImageJ. According to the software manual (ImageJ User Guide IJ 1.46r), a “Round” parameter obtained through analysis represents a ratio of the pixel area of the particle to the area of a circle that uses a fitted long diameter as a diameter, and may be used for representing the sphericity of the particle. When the particle is closer to being spherical, the ratio of the pixel area to the area of the circle that uses the fitted long diameter as the diameter is closer to 1. Therefore, the sphericity of the particle is represented by using the "Round" parameter of the particle obtained through analysis. Particles having particle sizes of less than 50 nm have a relatively large error in a statistical process, and are difficult to be accurately identified. In addition, the particle size of the conductive agent is generally less than 50 nm, and a relatively large error may be generated to a statistical result. Therefore, none of particles having particle sizes of less than 50 nm is counted in the particle size statistical process of the present application, and particle statistics data corresponding to a case that Round is displayed as "NaN" is deleted. According to the foregoing method, to satisfy the number of samples having statistical significance, not less than 10 scanning electron microscope images whose fields of view do not overlap are collected from each electrode plate. The sphericities of the obtained at least 1000 particles are arranged in ascending order, and the sphericity cumulative distribution curve of the particles in the positive electrode film layer is obtained by using the sphericity as a horizontal axis and a cumulative area percentage as a vertical axis. $L_{A50}$ is a sphericity L value corresponding to a case that a cumulative area percentage on the vertical axis in the particle sphericity L value cumulative distribution curve is 50%.

In some implementations, in a sphericity area cumulative distribution curve of particles whose particle sizes are greater than or equal to 1 μm in a cross section of the positive electrode film layer in an electrode plate thickness direction, a sphericity median $L_{A50}$ is optionally 0.60, 0.61, 0.62, 0.63, 0.64, 0.65, 0.66, 0.67, 0.68, 0.69, 0.70, 0.705, 0.71, 0.72, 0.73, 0.74, 0.75, 0.76, 0.77, 0.78, 0.79, or 0.80, or in a value range between any two thereof.

The median of the sphericity of the particles whose particle size is greater than or equal to 1 μm is within the foregoing range. Large particles have relatively good sphericity, particle bridging caused by irregular shapes of the large particles is reduced, void content in the electrode plates is reduced, stress concentration exacerbated by the irregular shapes of the large particles is reduced, and rebounding of the electrode plates caused by stress release in a cycle process is reduced, so that the battery cell has a high capacity and the cycle performance of the battery cell is further improved.

A person skilled in the art may control the sphericity of the particle by using any known process. For example, the sphericity of the particle can be adjusted by performing a process such as grinding, polishing, chemical corrosion, mechanical stirring, pressing, coating, granulating, or addition of a surface active agent, and adjusting process parameters.

In some implementations, in the cross-section of the positive electrode film layer in the thickness direction of the electrode plate, in an area-weighted cumulative distribution curve of sphericity of particles whose particle size is greater than or equal to 1 μm, a median $L_{A50}$ of sphericity ranges from 0.65 to 0.75.

The median of the sphericity of the particles whose particle size is greater than or equal to 1 μm is within the foregoing range, which is beneficial to reducing stress concentration of large particles that is exacerbated by irregularity of the large particles, reducing rebounding of the electrode plates caused by stress release in a cycle process, and improving the cycle performance of the battery.

In some implementations, in the cross-section of the positive electrode film layer in the thickness direction of the electrode plate, in an area-weighted cumulative distribution curve of sphericity of particles whose particle size is greater than or equal to 1 μm, a median $L_{A50}$ of sphericity ranges from 0.67 to 0.75.

The median of the sphericity of the particles whose particle size is greater than or equal to 1 μm is within the foregoing range, so that stress concentration of large particles can be further improved, and rebounding of the electrode plates caused by stress release in a cycle process can be reduced, thereby further improving the cycle life of the battery cell.

In some implementations, in a cumulative distribution curve of a graphitization degree C. value obtained from the positive electrode film layer in an area mapping mode of a laser microscopic confocal Raman spectrometer, a median $C_{50}$ of the graphitization degree is greater than or equal to 0.95 and less than or equal to 1.20, the graphitization degree C. value is $I_G/I_D$, $I_G$ represents the intensity of the G band at 1580±100 $cm^{-1}$ in Raman spectra, and $I_D$ represents the intensity of the D band at 1350±100 $cm^{-1}$ in Raman spectra.

In the present application, the graphitization degree C. value of the positive electrode film layer may be obtained in a laser micro-confocal Raman spectrometer surface scanning mode. As an example, specifically, a laser micro-confocal Raman spectrometer (a high-precision Renishaw laser micro-confocal Raman spectrometer) is used, an excitation wave length of 532 nm is selected, an appropriate amount of positive electrode film layer is selected, surface scanning is performed on the surface of the positive electrode film layer or a cross section in the electrode plate thickness direction, a scanned region is 45 μm×45 μm, and is divided into 10×10 grids, a grid vertex is used as a test point, a step length is 5 μm, and a total quantity of scanned points is 100. In this way, a cumulative distribution curve of C values at different sites and a cumulative distribution curve of C values at the scanned region are obtained.

The positive electrode film layer in the present application may be a freshly prepared positive electrode film layer, or may be a positive electrode film layer obtained by disassembling the battery. The surface of the positive electrode film layer obtained by disassembling the battery unavoidably has residual electrolyte salt particles. To improve testing accuracy, preferably, the cross section of the positive electrode film layer in the electrode plate thickness direction is subject to surface scanning, to represent the graphitization degree of the positive electrode film layer.

The graphitization degree C. value of the positive electrode film layer is obtained by using a peak intensity ratio of a G peak (G-band) to a D peak (D-band) of a Raman spectrum, where a position of the G peak is 1580±100 $cm^{-1}$, which represents a carbon $sp^2$ hybridization structure; and a position of the D peak is 1350±100 $cm^{-1}$, which represents a disordered structure of carbon, where the disordered represents an irregular arrangement manner between carbon atoms in the structure.

The graphitization degree C. value cumulative distribution curve is a curve obtained by arranging the obtained at least 100 C values in ascending order, and using the graphitization degree as a horizontal axis and the cumulative quantity percentage as a vertical axis. $C_{50}$ is a C value corresponding to a case that a cumulative quantity percentage on the vertical axis in the graphitization degree C. value cumulative distribution curve is 50%. The graphitization degree median $C_{50}$ can reflect the graphitization degree, that is, the slip ease degree, of the whole particles in the positive electrode film layer compared with a point value; and can reduce impact of an extreme value in a test process compared with an average value, thereby improving confidence of a test result.

A person skilled in the art may control the graphitization degree of the active material particles by using any known process. For example, the graphitization degree of the active material particles can be adjusted by regulating each of the carbon source, the sintering temperature, the sintering time, the sintering pressure, and the sintering atmosphere.

In some implementations, in a graphitization degree C. value cumulative distribution curve of the positive electrode film layer that is obtained in a laser micro-confocal Raman spectrometer surface scanning mode, a graphitization degree median $C_{50}$ is optionally 0.95, 0.96, 0.97, 0.98, 0.99, 1.0, 1.01, 1.02, 1.03, 1.04, 1.05, 1.06, 1.07, 1.08, 1.09, 1.1, 1.11, 1.12, 1.13, 1.14, 1.15, 1.16, 1.17, 1.18, 1.19, or 1.20, or in a value range between any two thereof.

In a cumulative distribution curve of a graphitization degree C. value obtained from the positive electrode film layer in an area mapping mode of a laser microscopic confocal Raman spectrometer, a median $C_{50}$ of the graphitization degree is within the foregoing range, which can further improve the compaction density of the electrode plate, so that the content of large-sized particles in the positive electrode film layer can be reduced, thereby helping reduce, while maintaining the capacity of the battery, a rebounding phenomenon caused by excessive large particles in the film layer, and further improving the cycle performance of the battery.

In some implementations, in a cumulative distribution curve of a coating value B obtained from the positive electrode film layer in the area mapping mode of the laser microscopic confocal Raman spectrometer, a median $B_{50}$ of the coating value ranges from 0.30 to 0.60, the coating value B is $I_P/I_D$, $I_P$ represents the intensity of the P band at 948±100 $cm^{-1}$ in Raman spectra, and $I_D$ represents the intensity of the D band at 1350±100 $cm^{-1}$ in Raman spectra.

The coating value B cumulative distribution curve is a curve obtained by arranging the obtained at least 100 B values in ascending order, and using the coating value as a horizontal axis and the cumulative quantity percentage as a vertical axis. To reduce impact of an extreme value of coating values caused by a non-particle region in the positive electrode film layer on a test result, a median $B_{50}$ of the coating values is used to evaluate the compactness degree of the carbon material layer on the positive electrode active material. $B_{50}$ is a B value corresponding to a case that a cumulative quantity percentage on the vertical axis in the coating value B cumulative distribution curve is 50%.

In the present application, the coating value B of the positive electrode film layer may be obtained through scanning of a laser micro-confocal Raman spectrometer. As an example, specifically, a laser micro-confocal Raman spectrometer (a high-precision Renishaw laser micro-confocal Raman spectrometer) is used, an excitation wave length of 532 nm is selected, an appropriate amount of positive electrode film layer is selected, surface scanning is performed on the surface of the positive electrode film layer or a cross section in the electrode plate thickness direction, a scanned region is 45 μm×45 μm, and is divided into 10×10 grids, a grid vertex is used as a test point, a step length is 5 μm, and a total quantity of scanned points is 100. In this way, a cumulative distribution curve of B values at different sites and a cumulative distribution curve of B values at the scanned region are obtained. The positive electrode film layer in the present application may be a freshly prepared positive electrode film layer, or may be a positive electrode film layer obtained by disassembling the battery. The surface of the positive electrode film layer obtained by disassembling the battery unavoidably has residual electrolyte salt particles. To improve testing accuracy, preferably, the cross section of the positive electrode film layer in the electrode plate thickness direction is subject to surface scanning, to represent the coating value of the positive electrode film layer.

The coating value B of the positive electrode film layer is obtained by using a peak intensity ratio of a P peak (P-band) to a D peak (D-band) of a Raman spectrum, where a position of the P peak is 948±100 $cm^{-1}$, which represents a phosphate group $PO_4^{3-}$ structure; and the D peak is at a position of 1350±100 $cm^{-1}$, is one of characteristic peaks of the carbon material, and represents a defect or a disordered structure in a lattice of $sp^2$ hybridization carbon atoms. In a test process, an excitation wave length of 532 nm is selected, and a test depth is relatively small, and is only on a particle surface. Therefore, in a test result of the positive electrode film layer in a surface scanning mode of a laser microscopic confocal Raman spectrometer, a peak of a carbon structure exhibits higher intensity compared with a peak of a phosphate structure.

A person skilled in the art may control the coating value of the active material particles by using any known process. For example, the coating value of the active material particles can be adjusted by regulating each of the type of the carbon source, the addition amount of the carbon source, the sintering temperature, the sintering time, the sintering pressure, and the sintering atmosphere. The coating value B may reflect the compactness degree of the carbon material layer on the surface of the lithium-containing transition metal phosphate particles. A more compact carbon material layer indicates a lower strength of a phosphate structure detected in a Raman spectrum, and a smaller coating value B of the positive electrode film layer.

In some implementations, the positive electrode film layer further includes a coating layer disposed on at least a part of the surface of the lithium-containing transition metal phosphate particles, in a coating value B cumulative distribution curve of the positive electrode film layer that is obtained in a laser micro-confocal Raman spectrometer surface scanning mode, a coating value median $B_{50}$ is optionally 0.3, 0.31, 0.32, 0.33, 0.34, 0.35, 0.355, 0.36, 0.368, 0.369, 0.37, 0.38, 0.39, 0.4, 0.41, 0.42, 0.43, 0.44, 0.446, 0.45, 0.456, 0.46, 0.47, 0.48, 0.49, 0.5, 0.51, 0.52, 0.53, 0.54, 0.55, 0.56, 0.57, 0.58, 0.59, or 0.6, or in a value range between any two thereof.

The median $B_{50}$ of the coating value of the positive electrode film layer is within the foregoing range, indicating that the carbon material layer of the positive electrode active material is relatively compact and uniform, which is beneficial to improving slip uniformity of the positive electrode film layer in a rolling process, and reducing a phenomenon of stress concentration in the positive electrode film layer. In addition, with the aid of the compact and uniform carbon material layer, the large particles in the positive electrode film layer can more easily slip in a compaction process, thereby reducing a stress concentration phenomenon at the large particles in the positive electrode film layer, reducing rebounding caused by stress release at the large particles in a cycle process, and improving the cycle life of the battery.

In some implementations, an iron dissolution rate of the positive electrode material ranges from 658 ppm to 1921 ppm.

An iron dissolution rate of the positive electrode material may be tested by using a known method in the art. As an example, 7.5 g of positive electrode material powder obtained by scraping a sample of the positive electrode film layer is weighted, and the positive electrode material powder is added to 100.3 g of an ascorbic acid solution having a mass concentration of 0.3% (a solvent is ultra pure water). After 305 minutes of stirring at a speed of 500 revolutions per minute, the solution is quickly sucked by using a 5 mL syringe. The solution is filtered into a test tube by using a filter head with an aperture of 0.45 μm. 1 mL of supernatant is sucked by using a pipette, and the supernatant is added to a glass volumetric flask and diluted by 50 times. The test is performed by using an inductively coupled plasma mass spectrometer (ICP-OES), to obtain the iron element concentration in the solution. By using a formula: (ICP test iron element concentration×solution volume/mass of the solution participating in volume fixing)×100.3 g/mass of the positive electrode material powder, the volume of the solution is 50 mL, the mass of the solution participating in volume fixing is 1 g, and the iron dissolution rate of the positive electrode material is calculated.

In some implementations, an iron dissolution rate of the positive electrode material may be 658 ppm, 700 ppm, 800 ppm, 890 ppm, 900 ppm, 1000 ppm, 1058 ppm, 1076 ppm, 1100 ppm, 1143 ppm, 1200 ppm, 1236 ppm, 1300 ppm, 1311 ppm, 1384 ppm, 1349 ppm, 1400 ppm, 1485 ppm, 1500 ppm, 1531 ppm, 1600 ppm, 1700 ppm, 1800 ppm, or 1921 ppm, or in a value range between any two thereof.

In some implementations, an iron dissolution rate of the positive electrode material ranges from 658 ppm to 1485 ppm.

The iron element dissolved from the positive electrode material is mainly derived from the lithium-containing transition metal phosphate particles of the positive electrode active material. An iron dissolution rate depends on the number of lattice defects in the lithium-containing transition metal phosphate particles in one aspect, and depends on the integrity and compactness of the surface carbon material layer of the positive electrode active material in the other aspect. A lower iron dissolution rate means fewer lattice defects in the lithium-containing transition metal phosphate particles, which helps to reduce corrosion of the lattice in a weak-acid environment. In addition, the carbon material layer on the surface of the positive electrode active material is more integral and compact, and therefore, dissolution of iron ions in a weak-acid environment is suppressed. The positive electrode material having the iron dissolution rate within the foregoing range has relatively few lattice defects and an integral and compact carbon material layer, which helps improve the compression resistance and slippage ease degree of the particles in the positive electrode film layer under large rolling pressure, improves the compaction density of the positive electrode film layer, reduces the stress concentration in the positive electrode film layer, and improves the rebounding phenomenon of the large particles generated due to the stress concentration, so that the battery has a good capacity, thereby further improving the cycle performance of the battery.

In some implementations, the lithium-containing transition metal phosphate particles in the positive electrode film layer include a component shown in the following general formula:

Formula I

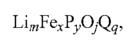

$Li_mFe_xP_yO_jQ_q$, where Q includes one or more of Al, Na, K, Mg, Cu, Mn, Cr, Zn, Pb, Ca, Co, Ni, Sr, Nb, V, Ti, B, S, Si, N, F, Cl, Br, $0.8 \leq m \leq 1.15$, $0.9 \leq x \leq 1$, $0.95 \leq y \leq 1$, $3.5 \leq j \leq 4$, and $0 \leq q \leq 0.1$.

In some implementations, m is optionally 0.8, 0.85, 0.9, 0.95, 0.98, 1.00, 1.03, 1.05, 1.08, 1.10, 1.13, or 1.15, or in a value range between any two thereof, x is optionally 0.9, 0.91, 0.92, 0.93, 0.94, 0.95, 0.96, 0.97, 0.98, 0.99, or 1.0, or in a value range between any two thereof, y is optionally 0.95, 0.96, 0.97, 0.98, 0.99, or 1.00, or in a value range between any two thereof, j is optionally 3.5, 3.6, 3.7, 3.8, 3.9, or 4, or in a value range between any two thereof, and q is optionally 0, 0.01, 0.02, 0.03, 0.04, 0.05, 0.06, 0.07, 0.08, 0.09, or 0.1, or in a value range between any two thereof.

In some implementations, the lithium-containing transition metal phosphate particles in the positive electrode film layer includes one or more of lithium iron phosphate, lithium manganese phosphate, lithium vanadium fluorophosphate, lithium iron manganese phosphate, and a modified material thereof.

In some implementations, the lithium-containing transition metal phosphate particles in the positive electrode film layer includes one or more of lithium iron phosphate, a doped and modified material thereof, and a coated and modified material thereof.

In some implementations, based on a total mass of the lithium-containing transition metal phosphate particles in the positive electrode film layer, a mass content of titanium ranges from 500 ppm to 8000 ppm.

In some implementations, based on a total mass of the lithium-containing transition metal phosphate particles in the positive electrode film layer, a mass content of titanium ranges from 1000 ppm to 3000 ppm.

Types and contents of elements in the lithium-containing transition metal phosphate particles in the positive electrode film layer may be tested in any well-known manner in the art. For example, with reference to Appendix C of GB/T 33822-2017, a titanium element and a content are tested through inductively coupled plasma atomic emission spectroscopy.

In some implementations, based on a total mass of the lithium-containing transition metal phosphate particles in the positive electrode film layer, a mass content of titanium is optionally 500 ppm, 600 ppm, 700 ppm, 800 ppm, 900 ppm, 1000 ppm, 1100 ppm, 1200 ppm, 1400 ppm, 1500 ppm, 1600 ppm, 1700 ppm, 1800 ppm, 1900 ppm, 2000 ppm, 2100 ppm, 2200 ppm, 2300 ppm, 2400 ppm, 2500 ppm, 2600 ppm, 2700 ppm, 2800 ppm, 2900 ppm, 3000 ppm, 3500 ppm, 4000 ppm, 4500 ppm, 5000 ppm, 5500 ppm, 6000 ppm, 6500 ppm, 7000 ppm, 7500 ppm, or 8000 ppm, or in a value range between any two thereof.

To introduce titanium into the lithium-containing transition metal phosphate particles, a titanium source needs to be added in a process of preparing the positive electrode active material. The titanium source is usually an inert material, and can achieve the functions of reducing reactivity and suppressing particle dimension growth after being adhered to the surface of the lithium-containing transition metal phosphate particle raw material. Increasing the graphitization degree of the positive electrode active material usually requires a relatively high sintering temperature or a relatively long sintering time. However, this also increases the size of the particles in the positive electrode film layer, increases stress concentration of the positive electrode film layer, and increases rebounding of the electrode plate in a cycle process. According to this embodiment of this application, a high-content titanium element is added to the lithium-containing transition metal phosphate particles, so that the reaction activity of the synthetic raw material of the positive electrode active material is reduced, the percentage of large particles is controlled while the positive electrode active material has a high degree of graphitization, stress concentration of the positive electrode film layer is reduced, and a rebounding phenomenon generated on the large particles due to the stress concentration is improved. Therefore, the battery has a good capacity, thereby further improving the cycle performance of the battery.

In addition, the doping of titanium in the positive electrode active material is conducive to inducing lattice distortion and reducing Li—O bond energy, thereby increasing the transport rate of lithium ions, and improving the dynamic performance of the battery. Uneven diffusion of the lithium ions in the positive electrode film layer is usually accompanied with a significant lithium ion concentration gradient. In this embodiment of this application, a high-content titanium element is added to the lithium-containing transition metal phosphate particles to improve a solid-phase transport rate of the positive electrode active material, thereby alleviating a dynamic problem of the battery.

In some implementations, based on the total mass of the lithium-containing transition metal phosphate particles in the positive electrode film layer, a mass content of vanadium ranges from 500 ppm to 5000 ppm.

Types and contents of elements in the lithium-containing transition metal phosphate particles in the positive electrode film layer may be tested in any well-known manner in the art. For example, with reference to Appendix C of GB/T 33822-2017, a vanadium element and a content are tested through inductively coupled plasma atomic emission spectroscopy.

In some implementations, based on a total mass of the lithium-containing transition metal phosphate particles in the positive electrode film layer, a mass content of vanadium is optionally 500 ppm, 600 ppm, 700 ppm, 800 ppm, 900 ppm, 1000 ppm, 1100 ppm, 1200 ppm, 1400 ppm, 1500 ppm, 1600 ppm, 1700 ppm, 1800 ppm, 1900 ppm, 2000 ppm, 2100 ppm, 2200 ppm, 2300 ppm, 2400 ppm, 2500 ppm, 2600 ppm, 2700 ppm, 2800 ppm, 2900 ppm, 3000 ppm, 3500 ppm, 4000 ppm, 4500 ppm, or 5000 ppm.

In some implementations, based on the total mass of the lithium-containing transition metal phosphate particles in the positive electrode film layer, a mass content of vanadium ranges from 500 ppm to 3000 ppm.

Vanadium in the positive electrode film layer can exist in multiple valence states. +5-valent vanadium ($V^{5+}$) can be doped at phosphorus sites, and can induce lattice distortion due to its large radius, expanding lithium-ion diffusion channels, thereby improving the ion conductivity of the positive electrode active material, and improving the dynamic performance of the battery. +3-valent vanadium ($V^{3+}$) may be doped at transition metal sites, generating lithium vacancies through charge compensation, thereby improving the electron conductivity of the positive electrode active material. In addition, the distribution uniformity of vanadium in the lithium-containing transition metal phosphate particles is improved, which is conducive to further improving the dynamic performance of the positive electrode film layer and the reaction uniformity of the positive electrode film layer, thereby further improving the dynamic performance and the cycle performance of the battery cell.

The mass content of the vanadium element being within the foregoing range helps to improve the dynamic performance of the positive electrode plate, and improve the dynamic performance of the lithium-containing transition metal phosphate battery. In addition, synergy between the titanium element, the vanadium element, and the carbon nanotube in the positive electrode film layer helps form a good three-dimensional network, and further improve electronic conductivity and ionic conductivity of the positive electrode film layer, thereby further improving the dynamic performance of the lithium-containing transition metal phosphate battery.

In some implementations, the positive electrode film layer further includes a conductive agent, and based on a total area of the cross-section of the positive electrode film layer in the thickness direction of the electrode plate, a total area percentage of agglomeration regions of the conductive agent ranges from 0.2% to 6%, and optionally ranges from 1.5% to 5%.

That a total area percentage of agglomeration regions of the conductive agent based on a total area of the cross-section of the positive electrode film layer in the thickness direction of the electrode plate is within the foregoing range indicates that the conductive agent in the positive electrode film layer is uniformly dispersed, and is easy to form a uniform conductive network, which helps to reduce a problem of local polarization and even lithium plating generated in the battery during a cycle process.

In addition, research shows that large-sized particles in the lithium-containing transition metal phosphate easily rebound, and that the agglomeration area of the conductive agent is within the foregoing range can suppress rebounding of the lithium-containing transition metal phosphate particles with the aid of even distribution of the conductive agent, so that mechanical binding is formed on the particles and even the film layer, the cohesion of the film layer is improved, the damage of the SEI film and the film layer in a rebounding process of the film layer is reduced, and the cycle life of the battery is improved.

An area percentage of agglomeration regions of the conductive agent based on a total area of the cross-section of the positive electrode film layer in the thickness direction of the electrode plate may be tested by using the following method. The cross-section of the positive electrode film layer in the thickness direction of the electrode plate is observed through a scanning electron microscope using a method similar to the above. The areas of the agglomeration regions of the conductive agent in the scanning electron micrograph are measured at a magnification of 3 k. Because the conductive agent is generally a carbon-based material, for example, a conductive carbon black or a carbon nanotube, the agglomeration region of the conductive agent usually presents a black aggregated shape compared with another region of the positive electrode film layer, and the aggregated conductive agent can be seen under a high magnification. The agglomeration region of the conductive agent refers to a black region range of the conductive agent that is in a scanning electron microscope image and that is significantly agglomerated. With the help of image analysis software such as ImageJ, statistics are collected on a white marked region in the image, a region whose Feret is displayed to be greater than or equal to 2 μm is screened out, and a parameter "Feret" obtained through analysis represents a maximum distance between all parallel lines in a two-dimensional projection of the region. The total area of the region is a total area of an agglomeration region of the conductive agent in the scanning electron microscope image. The percentage of the area of the agglomeration region of the conductive agent is represented by dividing a total area of an agglomeration region of the conductive agent, which is obtained through testing, in the scanning electron microscope image at a magnification of 3 k by the area of the scanning electron microscope image. Three scanning electron microscope images whose ranges do not overlap are randomly selected, and an average value is calculated, and is used as "a total area percentage of agglomeration regions of the conductive agent based on a total area of the cross-section of the positive electrode film layer in the thickness direction of the electrode plate".

In some implementations, the conductive agent includes carbon nanotubes, the carbon nanotubes include one or more of single-walled carbon nanotubes, few-walled carbon nanotubes, and multi-walled carbon nanotubes, and optionally, the conductive agent further includes conductive carbon black.

The carbon nanotube has a high aspect ratio, which is beneficial to overlapping between a plurality of positive electrode particles in the thickness direction, forms a long-range conductive path and improves a binding force between the particles, reduces a problem of local polarization and even lithium plating that is generated in a battery during a cycle process, and improves the cycle life of the battery. In addition, through a binding effect, a rebounding phenomenon of large particles in the positive electrode film layer can be reduced, thereby improving the cycle performance of the battery.

Conductive carbon black has a small size, attaches to the surfaces of the positive electrode particles and fills voids of the positive electrode particles, and forms dense dotted-like conductive contact. The matched use of the conductive carbon black and the carbon nanotube helps to further improve the conductive network in the positive electrode film layer while considering both long-range electrical conduction and short-range electrical conduction. In addition, the conductive agent has a large specific surface area, which is beneficial to liquid wicking and liquid retention, can reduce a phenomenon of extrusion of the electrolyte solution that is caused by a high expansion force increase during a long cycle process of the electrode plate, and improve the long cycle life of the battery.

In some implementations, the agglomeration regions of the conductive agent include carbon nanotubes and conductive carbon black.

Researchers find that carbon nanotubes are prone to an agglomeration phenomenon due to the high surface energy of carbon nanotubes. As a result, the dispersion of carbon nanotubes in the positive electrode film layer is nonuniform, and an effective network structure of carbon nanotubes fails to be formed. Conductive carbon black has surface energy close to that of carbon nanotubes and can be adsorbed on the surface of carbon nanotubes to form a physical barrier, to increase the resistance against the agglomeration of carbon nanotubes and reduce direct contact between carbon nanotubes, thereby further inhibiting the agglomeration phenomenon and improving the distribution uniformity of carbon nanotubes in the positive electrode film layer. In an aspect, this helps to improve the conductivity of the positive electrode film layer and improve the dynamic performance of the battery. In the other aspect, this helps the carbon nanotubes to bind the positive electrode film layer, thereby reducing a risk of shedding of the positive electrode film layer, and further improving the dynamic performance and the cycle life of the battery. In addition, the agglomeration of carbon nanotubes in the agglomeration regions of the conductive agent further leads to congestion in a localized ion transport path in the agglomeration regions of the conductive agent, and the combination with conductive carbon black can improve the lithium ion transport capability in the region, thereby reducing localized polarization, and further improving the cycle stability of the battery.

In some implementations, based on a mass of the positive electrode film layer, a mass content C1 of the carbon nanotubes meets: $0<C1\leq 2.5\%$, and a mass content C2 of the conductive carbon black meets: $0<C1\leq 2.5\%$.

In some implementations, based on a mass of the positive electrode film layer, a mass content C1 of the carbon nanotubes is optionally 0.1%, 0.2%, 0.3%, 0.4%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2.0%, 2.1%, 2.2%, 2.3%, 2.4%, or 2.5%, or in a value range between any two thereof.

In some implementations, based on a mass of the positive electrode film layer, a mass content C2 of the conductive carbon black is optionally 0.1%, 0.2%, 0.3%, 0.4%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2.0%, 2.1%, 2.2%, 2.3%, 2.4%, or 2.5%, or in a value range between any two thereof.

The mass contents of the carbon nanotubes and the conductive carbon black are within the foregoing ranges, so that an agglomeration phenomenon of the carbon nanotubes can be effectively relieved and a good conductive network structure can be formed, thereby effectively alleviating a stress concentration of the positive electrode film layer, and improving a liquid retention rate of the positive electrode film layer in a long cycle process, further reducing a shedding risk and a polarization degree of the positive electrode film layer, improving the dynamic performance of the battery, and improving the cycle life of the battery.

In some implementations, the positive electrode film layer further includes a dispersant, and the dispersant includes hydrogenated nitrile butadiene rubber HNBR.

A polar group (for example, a cyano group, —CN) in the hydrogenated nitrile butadiene rubber HNBR may have an interaction (for example, a hydrogen bond or dipolar interaction) with a hydroxy group (—OH) on a surface of the lithium-containing transition metal phosphate particle or a site of a metal oxide, to enhance compatibility between the particle and the solvent, and reduce interfacial tension between the particle and the solvent, especially interfacial tension of large particles, so that the particles can be uniformly dispersed more easily, aggregation caused by hydrophobicity is reduced, the dispersibility of the large particles in the positive electrode film layer is improved, and stress concentration generated in a die cutting process of the positive electrode film layer is reduced.

In addition, when a film is formed by drying a slurry, the elastic network structure of the HNBR can buffer a shrinking stress generated due to the volatilization of the solvent, and reduce re-aggregation of the conductive agent due to a capillarity force in this process, thereby reducing an area percentage of an agglomeration region of the conductive agent, and improving a cycle life of the battery.

In some implementations, based on the mass of the positive electrode film layer, a mass content of the dispersant ranges from 0.5% to 2%.

In some implementations, based on the mass of the positive electrode film layer, a mass content of the dispersant is optionally 0.5%, 0.6%, 0.7%, 0.8%, 0.9%, 1%, 1.1%, 1.2%, 1.3%, 1.4%, 1.5%, 1.6%, 1.7%, 1.8%, 1.9%, or 2%, or in a value range between any two thereof.

The mass content of the dispersant is within the foregoing range, so that the particles in the positive electrode film layer can be uniformly dispersed while a high loading of the positive electrode film layer is maintained, and the battery has good capacity and cycle performance.

In some implementations, when the battery cell is in a fully-discharged state, a compaction density of the positive electrode plate ranges from 2.3 $g/cm^3$ to 2.6 $g/cm^3$.

In the present application, the fully-discharged state refers to a state in which the battery is placed in an oven environment at 25° C. to stand for 2 h, and after the temperature of the battery is maintained at 25° C., the battery is discharged to 2.5V at a constant current of ⅓C and then is discharged to 2.0V at a constant current of 0.1 C.

The compaction density of the positive electrode plate can be tested using methods known in the art. As an example, the battery is placed in an oven environment at 25° C. to stand for 2 h until a temperature of the battery is maintained at 25° C. The battery is discharged to 2.5V with a constant current of ⅓C and then is discharged to 2.0V with a constant current of 0.1 C. The battery is disassembled, to obtain a positive electrode plate. The residual electrolytic solution is treated by using a solvent of dimethyl carbonate, the electrode plate is dried, and is cut into a small disk whose area is S, to obtain a mass $W_1$ of the disk, and a thickness $T_1$ of the positive electrode plate is measured by using a micrometer. Then, the positive electrode film layer of the weighed electrode plate is wiped off, a mass of the current collector is weighed, and is recorded as $W_2$, and a thickness $T_2$ of the current collector is measured by using the micrometer. Therefore, the compaction density of the positive electrode plate is $PD=(W_1-W_2)/[(T_1-T_2)\times S]$.

In some implementations, when the battery cell is in a fully-discharged state, a compaction density of the positive electrode plate is optionally 2.3 $g/cm^3$, 2.31 $g/cm^3$, 2.32 $g/cm^3$, 2.33 $g/cm^3$, 2.34 $g/cm^3$, 2.35 $g/cm^3$, 2.36 $g/cm^3$, 2.37 $g/cm^3$, 2.38 $g/cm^3$, 2.39 $g/cm^3$, 2.40 $g/cm^3$, 2.41 $g/cm^3$, 2.42 $g/cm^3$, 2.43 $g/cm^3$, 2.44 $g/cm^3$, 2.45 $g/cm^3$, 2.46 $g/cm^3$, 2.47 $g/cm^3$, 2.48 $g/cm^3$, 2.49 $g/cm^3$, 2.50 $g/cm^3$, 2.51 $g/cm^3$, 2.52 $g/cm^3$, 2.53 $g/cm^3$, 2.54 $g/cm^3$, 2.55 $g/cm^3$, 2.56 $g/cm^3$, 2.57 $g/cm^3$, 2.58 $g/cm^3$, 2.59 $g/cm^3$, or 2.60 $g/cm^3$, or in a value range between any two thereof.

In some implementations, a porosity of the positive electrode film layer ranges from 14% to 28%.

The porosity of the positive electrode film layer may be tested in the following manner. A scanning electron microscope image of a cross section of the positive electrode film layer in the electrode plate thickness direction obtained in the foregoing manner is imported into ImageJ software, a line tool is selected, a scale length in the image is marked by using a straight line, "Analyze Set Scale" is clicked, and a scale parameter is set in the software according to the scale length in the image. A rectangle tool is selected, a part of the image outside the scale region is selected, the selected region is duplicated by using "Image Duplicate", and the image format is adjusted by using "Image Type 8 bit"; "Analyze Set Measurements" is selected, and the following 5 options are selected: "Area", "Mean gray value", "Area Fraction", "Limit to Threshold", and "Feret's diameter", where 3 is selected for "Decimal places", "Image"-"Adjust"-"Threshold" is sequentially selected, and 0 and 100 are sequentially set at positions boxed by "Threshold", so that pore data in the electron microscope image of the cross section can be exported by using an Analyze-Measure function. Exporting is performed by using "Image"-"Overlay"-"Flatten", to obtain a pore image; "Apply" in "Threshold" is clicked, then "Analyze"-"Analyze Particles" is clicked, and the left four columns are checked, to obtain pore statistics data.

It may be understood that in this embodiment of the present application, the "pore" in the cross section of the positive electrode film layer is identified by using the image color difference and the threshold. The "pore" is not pore data obtained in the venting test, and is mainly used for representing a cross-sectional area between particles in a cross section of the positive electrode film layer. This method is better than the venting method, because the porosity obtained in the venting method is related to a pore between the particles, and is also related to a pore in the carbon material on the surface of the lithium iron phosphate particles. Consequently, the pore between the particles cannot be objectively reflected.

The porosity of the positive electrode film layer being within the foregoing range is beneficial to, in one aspect, improving a liquid retention feature of the electrolyte solution, improving ion diffusiveness of the positive electrode film layer having large particles of a particular area percentage, and improving dynamic performance of the battery.

In some implementations, a porosity of the positive electrode film layer is optionally 14%, 15%, 16%, 17%, 18%, 19%, 20%, 21%, 22%, 23%, 24%, 25%, 26%, 27%, or 28%, or in a value range between any two thereof.

In some implementations, a base coating layer is disposed in a bottom region of the positive electrode film layer close to the positive current collector, the base coating layer includes a conductive agent and a binder, the conductive agent includes carbon nanotubes and conductive carbon black, and the binder includes a vinylidene fluoride polymer.

In some implementations, a thickness of the base coating layer ranges from 0.5 μm to 5 μm.

In some implementations, a thickness of the base coating layer is optionally 0.5 μm, 1 μm, 1.5 μm, 2 μm, 2.5 μm, 3 μm, 3.5 μm, 4 μm, 4.5 μm, or 5 μm, or in a value range between any two thereof.

The base coating layer provided in the embodiments of this application is conducive to improving the bonding force between the positive electrode film layer and the positive current collector and mitigating the phenomenon of stress concentration at large particles, thereby reducing a probability that the positive electrode film layer sheds off, and improving the cycle stability of the battery. In addition, compared with the direct contact between the positive current collector and the positive electrode film layer, the contact area between the base coating layer and the positive electrode film layer is increased, which is conducive to increasing an electron transport area between the current collector and the positive electrode film layer, thereby reducing the internal resistance of the electrode plate, and improving the dynamic performance of the battery.

In some implementations, a thickness of the base film in the separator ranges from 7 μm to 9 μm.

In some implementations, a thickness of the base film in the separator is optionally 7 μm, 7.5 μm, 8 μm, 8.5 μm, or 9 μm, or in a value range between any two thereof.

In some implementations, a single-side thickness of the ceramic layer in the separator ranges from 2 μm to 4 μm.

In some implementations, a single-side thickness of the ceramic layer in the separator is optionally 2 μm, 2.5 μm, 3 μm, 3.5 μm, or 4 μm, or in a value range between any two thereof.

In some implementations, a single-side thickness of the bonding layer in the separator ranges from 1 μm to 5 μm.

In some implementations, a single-side thickness of the bonding layer in the separator is optionally 1 μm, 1.5 μm, 2 μm, 2.5 μm, 3 μm, 3.5 μm, 4 μm, 4.5 μm, or 5 μm, or in a value range between any two thereof.

The thickness of the bonding layer is excessively low, the space for buffering expansion in the separator is small, and the bonding force between the separator and the electrode plate is low. In one aspect, after the film layer expands, the stress increases, and a probability that the film layer sheds off increases, affecting the cycle life of the battery. In the other aspect, a probability that positive and negative electrodes overlap to cause short-circuit increases, thereby affecting safety performance of the battery. An excessively large thickness of the bonding layer causes a large space occupancy rate of the battery, thereby affecting the volume energy density of the battery. In this embodiment of this application, the thickness of the bonding layer is within the foregoing range, which helps to take the cycle life, safety performance, and the volume energy density of the battery into consideration.

Figure 5:
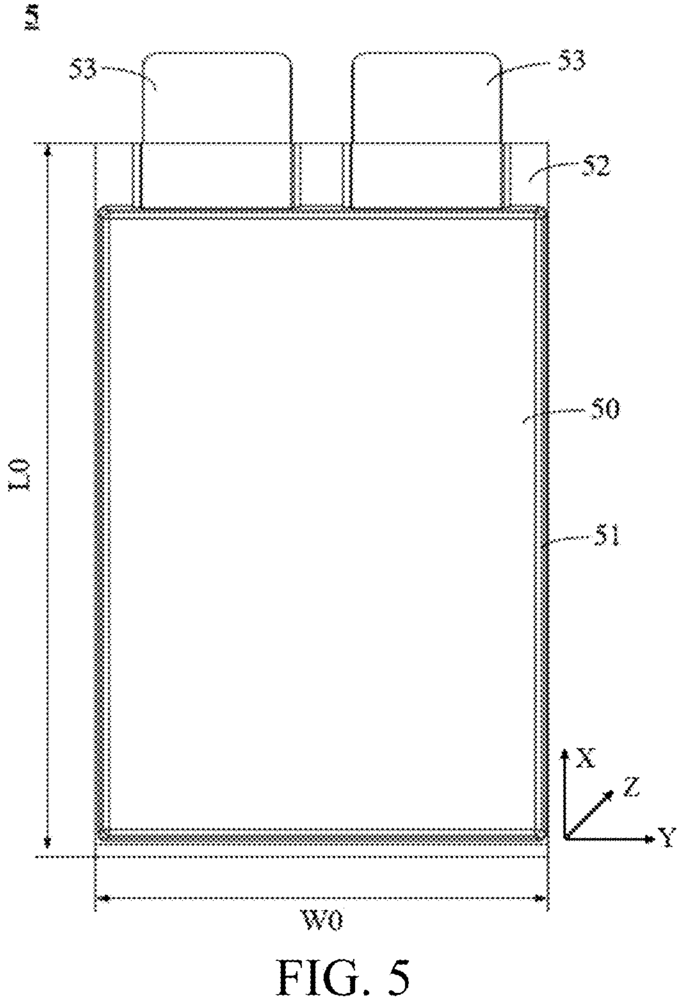
FIG. 5 is a front view of a battery cell according to an implementation of this application.

In some implementations, as shown in FIG. 5, the battery cell 5 includes a housing 50, the stacked electrode assembly is accommodated in the housing 50, a dimension of the housing 50 in a length direction X is L0, a dimension of the housing 50 in a width direction Y is $W_1$, a dimension of the housing 50 in the thickness direction Z is $H_1$, 480 mm≤L0≤720 mm, 100 mm≤$W_1$≤150 mm, and 14 mm≤$H_1$≤22 mm.

In some implementations, L0 is optionally 480 mm, 490 mm, 500 mm, 510 mm, 520 mm, 530 mm, 540 mm, 550 mm, 560 mm, 570 mm, 580 mm, 590 mm, 600 mm, 610 mm, 620 mm, 630 mm, 640 mm, 650 mm, 660 mm, 670 mm, 680 mm, 690 mm, 700 mm, 710 mm, 720 mm, 750 mm, 800 mm, 850 mm, 900 mm, 950 mm, 1000 mm, 1050 mm, 1100 mm, 1150 mm, 1200 mm, 1250 mm, or 1300 mm, or in a value range between any two thereof.

In some implementations, $W_1$ is optionally 100 mm, 110 mm, 120 mm, 130 mm, 140 mm, or 150 mm, or in a value range between any two thereof.

In some implementations, Hi is optionally 14 mm, 15 mm, 16 mm, 17 mm, 18 mm, 19 mm, 20 mm, 21 mm, or 22 mm, or in a value range between any two thereof.

The size of the housing of the battery cell in this embodiment of this application is within the foregoing range, helping the battery to achieve a relatively good capacity.

In some implementations, the dimension of the housing in the length direction is L0, and 450 mm≤L0≤650 mm.

The dimension L0 of the housing in the length direction satisfies 450 mm≤L0≤650 mm, the length of the battery cell is relatively short, which helps to shorten a current diffusion path and reduce internal resistance of the electrode plate, thereby reducing heat generation of the battery and improving dynamic performance of the battery. In addition, a relatively short housing length helps shorten a diffusion path of the electrolyte solution in an infiltration process, improves an infiltration rate and uniformity of the electrolyte solution, further promotes uniformity of de-intercalation of the lithium ions in a cycle process, relieves a stress concentration phenomenon, reduces a degree of rebounding of the film layer, and improves the cycle stability of the battery cell.

In some implementations, the dimension of the housing in the length direction is L0, and 900 mm≤L0≤1300 mm.

When the dimension L0 of the housing in the length direction satisfies 900 mm≤L0≤1300 mm, the size of the battery cell is relatively long, which helps to reduce the volume percentage of the housing in the battery cell and improve the load percentage of the active material. In addition, the long battery cell can reduce the number of batteries required in a battery module, to simplify the structural design of the battery module, and reduce the number and complexity of the structural members in the module, thereby improving the space utilization of a battery pack, and further increasing the volumetric energy density of the battery cell.

In some implementations, as shown in FIG. 5, the housing 50 is made of a pouch-type material, and the pouch-type material includes an aluminum laminate composite film.

In some implementations, the material of the housing includes a composite film formed by aluminum and one or more of polypropylene (PP), polybutylene terephthalate (PBT), polybutylene succinate (PBS), nylon, polyethylene terephthalate (PET), and polyethylene (PE).

The pouch-type material has a relatively high elongation rate. Therefore, the housing of the pouch-type material is lighter, thinner, and softer, which helps improve space utilization of the battery cell, thereby improving the energy density of the battery cell. In addition, the high barrier property of the aluminum can effectively reduce infiltration of water and oxygen gas into the battery, and reduce decomposition of an electrolyte solution and an extent of oxidation of an electrode material, thereby improving the life of the battery.

In some implementations, still referring to FIG. 5, the housing 50 includes a first sealing zone 51, and the first sealing zone 51 is disposed at at least one end of the stacked electrode assembly extending along the width direction (Y direction); the first sealing zone 51 includes a folded edge structure extending along the length direction (X direction), a sealing adhesive is disposed on the folded edge structure, and the sealing adhesive is continuously disposed in the length direction (X direction) and secures the folded edge structure.

The folded edge structure refers to a strengthening structure formed by folding the sealing area in half, and a quantity of times of folding is not limited. As an example, the folded structure may be a single-folded edge structure formed by folding the sealing area once, or may be a double-folded edge structure formed by folding two sides of the sealing area.

The SEI film of the positive electrode film layer may be increased in a process of cycling an electrode plate. Therefore, large rebounding and gas generation may be caused in a long cycle process. The sealing zone of the pouch-type electrode assembly is used for sealing the electrode assembly, but the sealing zone has a limited strength, and is easy to be punched open by large rebounding and high gas generation in the film layer.

In this embodiment of this application, the first sealing zone includes the folded edge structure extending along the length direction, thereby further improving the sealing strength of the first sealing zone. Compared with discontinuous disposition of the sealing adhesive along the length direction, continuous disposition of the sealing adhesive along the length direction and fixing of the folded edge structure can further improve sealing strength, implement continuous hardening of the sealing zone in the length direction, and reduce a probability that the electrode plate punches open the sealing zone in the package in a cyclic rebounding process.

In some implementations, the housing includes 50 at least one second sealing zone 52, the second sealing zone 52 is disposed at at least one end of the stacked electrode assembly in the length direction of the housing, and the second sealing zone 52 is disposed on a tab side of the stacked electrode assembly.

It may be understood that the positive electrode plate and the negative electrode plate may be disposed on the same side of the stacked electrode assembly, as shown in FIG. 5, or may be disposed on different sides of the stacked electrode assembly.

In some embodiments, the battery cell 5 further includes a terminal 53. The terminal 53 is connected to a tab of the battery cell. For example, the terminal 53 may be soldered to the tab. The terminal 53 is a conductive member. The terminal 53 is at least partially located outside the housing 50. The terminal 53 is used as an electrode leading-out end of the battery cell 5. The terminal 53 is configured to facilitate the electrical connection between the battery cell 5 and another battery cell 5 or another component. For example, the terminal 53 may have a sheet shape.

Correspondingly, the terminal 53 also includes a positive electrode terminal and a negative electrode terminal, the positive electrode terminal is connected to the positive electrode plate, and the negative electrode terminal is connected to the negative electrode plate.

The second sealing zone is disposed on the tab side. The tab needs to be connected to a leading-out member. Connection strength between the leading-out member and the housing material is relatively weak, so that the gas easily rushes out from the second sealing zone. This is beneficial to implementing directional pressure release of the battery, reducing impact on an adjacent electrode assembly during thermal runaway, and improving the entire service life of the battery.

In some implementations, an outer periphery of the stacked electrode assembly is provided with a plurality of adhesive rings surrounding along the width direction, and the adhesive rings surrounding along the width direction are disposed at intervals in the length direction.

The adhesive rings surrounding the width direction of the electrode assembly are arranged at intervals in the length direction, which helps to fix positions of the electrode plates in the electrode assembly, reduce a probability of displacement of the electrode assembly in a shaking process of the battery, is especially applicable to a battery having a relatively large length, and can effectively reduce mutual displacement between the electrode plates in the length direction to cause a phenomenon of lithium plating, helping to keep a stable spatial structure of the battery, so that normal operation of the battery is not affected.

In some implementations, at 25° C., a capacity of the battery cell ranges from 100 Ah to 300 Ah, optionally ranges from 110 Ah to 190 Ah, and further optionally, ranges from 125 Ah to 180 Ah.

The capacity of the battery cell in the present application has a well-known meaning in the art and can be tested using methods known in the art. As an example, the battery cell is charged to 3.65V at a charging rate of 0.5 C of the nominal capacity of the battery cell at 25° C., then is charged to 0.05 C at a constant voltage of 3.65V, and is rested for 10 min, then is discharged to 2.5V at a discharging rate of 1 C, and is rested for 10 min. The capacity C in a discharging process is calculated by using the formula C=I*t, and the unit is Ah.

In some implementations, at 25° C., a capacity of the battery cell is optionally 100 Ah, 125 Ah, 130 Ah, 135 Ah, 140 Ah, 145 Ah, 150 Ah, 155 Ah, 160 Ah, 165 Ah, 170 Ah, 175 Ah, 180 Ah, 185 Ah, 190 Ah, or 300 Ah, or in a value range between any two thereof.

According to the battery cell in this embodiment of this application, the stacked electrode assembly is accommodated by using an appropriate housing size, and a film layer of the positive electrode plate in the stacked electrode assembly is controlled to have a reasonable percentage of large particles, so that the battery cell has a relatively high capacity.

In some implementations, the positive current collector may be a metal foil or a composite current collector. For example, as the metal foil, an aluminum foil may be used. The composite current collector may include a polymer material base layer or a metal layer located on at least one surface of the polymer material base layer. The composite current collector may be formed by forming a metal material (aluminum, an aluminum alloy, nickel, a nickel alloy, titanium, a titanium alloy, silver, a silver alloy, or the like) on the polymer material substrate (for example, a substrate of polypropylene (PP), polyethylene terephthalate (PET), polybutylene terephthalate (PBT), polystyrene (PS), or polyethylene (PE)).

In some implementations, the negative electrode current collector may be a metal foil or a composite current collector. For example, as the metal foil, a copper foil can be used. The composite current collector may include a polymer material undercoating and a metal layer formed on at least one surface of a polymer material substrate. The composite current collector may be formed by forming a metal material (copper, copper alloy, nickel, nickel alloy, titanium, titanium alloy, silver, silver alloy, or the like) on the polymer material substrate (for example, a substrate of polypropylene(PP), polyethylene terephthalate (PET), polybutylene terephthalate (PBT), polystyrene (PS), or polyethylene (PE)).

In some implementations, the negative electrode film layer includes a negative electrode active material. For example, the negative electrode active material may include at least one of the following materials: artificial graphite, natural graphite, soft carbon, and hard carbon. However, the present application is not limited to such materials, and may alternatively use other conventional materials that can be used as negative electrode active materials for batteries. These negative electrode active materials may be used alone or in combination with two or more.

In some implementations, the negative electrode film layer optionally further includes a binder. The binder may be at least one selected from styrene-butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In some implementations, the negative electrode film layer optionally includes another adjuvant such as a thickener (for example, sodium carboxymethyl cellulose (CMC-Na)).

In some implementations, the negative electrode plate may be prepared in the following manner: dispersing the foregoing components for preparing the negative electrode plate, for example, the negative electrode active material, the conductive agent, the binder, and any other components, in a solvent (for example deionized water) to form a negative electrode slurry; and coating the negative electrode slurry on the negative electrode current collector, followed by processes such as drying and cold pressing, to obtain the negative electrode plate.

A second aspect of the present application provides a battery apparatus, including the battery cell provided in the first aspect of the present application.

The battery apparatus disclosed in the embodiments of this application may be used in a power consuming device that uses a battery apparatus as a power supply or used in various energy storage systems that use a battery apparatus as an energy storage element. In addition to being applied to a vehicle, the battery apparatus may be further applied to, but is not limited to: a mobile phone, a tablet computer, a notebook computer, an electric toy, a power tool, an electric bike, an electric vehicle, a ship, or a spacecraft. The electric toy may include a stationary or mobile electric toy, such as a game console, an electric vehicle toy, an electric ship toy and an electric airplane toy. The spacecraft may include an airplane, a rocket, a space shuttle, a spaceship, etc.

In addition, this application further provides a power consuming apparatus using a battery apparatus as a power supply. The power consuming apparatus includes at least one of the battery cell, the battery module, or the battery pack provided in this application. The battery cell, the battery module, or the battery pack may be used as a power source of the power consuming apparatus, and may also be used as an energy storage unit of the power consuming apparatus.

For the power consuming apparatus, the battery cell, battery module, or battery pack can be selected according to use requirements.

Figure 6:
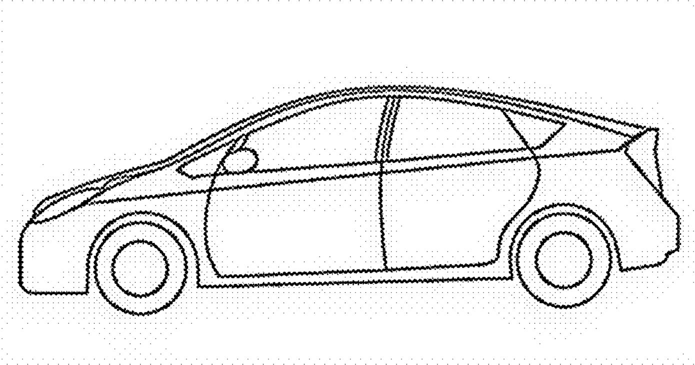
FIG. 6 is a schematic diagram of a power consuming apparatus according to an implementation of the present application.

FIG. 6 shows an example of a power consuming apparatus. The power consuming apparatus disclosed in an embodiment of this application may be an oil-fueled vehicle, a gas-powered vehicle, or a new energy vehicle. The new energy vehicle may be a battery electric vehicle, a hybrid electric vehicle, an extended-range electric vehicle, or the like. A battery apparatus is arranged inside the vehicle, and the battery apparatus may be arranged at the bottom, the head, or the tail of the vehicle. The battery apparatus may be configured to supply power to the vehicle. For example, the battery apparatus may be used as an operational power supply for the vehicle. The vehicle may also include a controller and a motor, and the controller is configured to control the battery apparatus to supply power to the motor, for example, for operating power demands while the vehicle is starting, navigating, and driving. In some embodiments of the present application, the battery apparatus not only may be used as the operating power supply of the vehicle, but also may be used as a driving power supply of the vehicle to provide driving power for the vehicle instead of or partially instead of fuel or natural gas.

An embodiment of this application further provides an energy storage apparatus using a battery apparatus as a power supply. The energy storage apparatus may be, but is not limited to, an energy storage container, an energy storage cabinet, an energy storage power station, an energy storage battery pack, or a portable energy storage system.

EXAMPLES

The examples of the present application are described below. The examples described below are illustrative, are merely used to explain the present application, and should not be construed as a limitation to the present application. Where no specific technologies or conditions are indicated in the embodiments, the technologies or conditions described in the literatures in the art or the instructions for the product are followed. The reagents or instruments without manufacturer indicated are all conventional products that may be purchased in the market.

Example 1

(1) Preparation of a Positive Electrode Active Material

Lithium carbonate, iron phosphate, titanium dioxide, vanadium pentoxide, sucrose, glucose, and polyethylene glycol were added to deionized water, and mixed in a premix tank, where a ratio of the lithium carbonate to the iron phosphate causes a molar ratio of the lithium to the iron to be 1.02:1.0. Based on a total mass of a mixed raw material, the mass content of the sucrose is 2%, the mass content of the glucose is 4%, and the mass content of the polyethylene glycol is 5%. The mixed raw material whose solid content is 38% was obtained after the mixed raw material was uniformly mixed.

The particle size $Dv_{50}$ of the lithium carbonate is 6 μm. The morphology of the iron phosphate particles is spheroidal. Titanium dioxide and vanadium pentoxide are both nano-particles. The purity of the sucrose is ≥98%. The moisture mass content of the glucose is <0.5%. Weight-average molecular weight of the polyethylene glycol is 1500.

Grinding was performed twice on the mixed raw materials in a sand grinder, then fine grinding was performed after coarse grinding for 1 h, and a temperature of the slurry was controlled to be less than 40 degrees Celsius during the grinding process, to obtain a mixed slurry, where the particle size $Dv_{50}$ of the solid particles in the mixed slurry is 0.40 μm, and spray drying was performed to obtain dry precursor powder, where the particle size $Dv_{50}$ of the dry precursor powder after the drying is 55.50 μm.

Two-stage temperature-rising and sintering were performed on the precursor powder in a nitrogen gas atmosphere to obtain a positive electrode active material: the temperature was risen from 25° C. to 460° C. (the first temperature-rising stage) at a temperature-rising rate of 2° C./min, and was held for 3 h; and the temperature was risen from 460° C. to 780° C. (the second temperature-rising stage) at a temperature-rising rate of 5° C./min, and was held for 12 h, where a gas feeding amount in the temperature-rising stage is greater than that in the constant-temperature stage, a ratio is 1.5:1, and a total gas feeding amount is 1350 $cm^3/h$. The temperature is reduced after the two-stage temperature-rising and sintering end. A lithium iron phosphate positive electrode active material whose particle size $Dv_{50}$ is 1.6 m and whose surface has a carbon material was obtained through jet milling, where based on a total mass of the positive electrode active material, a mass content of the Ti element is 1050 ppm, and a mass content of the V element is 950 ppm.

Dv10, $Dv_{50}$, and Dv90 refer to data obtained through testing by using a Malvern laser scattering method.

(2) Preparation of a Positive Electrode Plate

The foregoing positive electrode active material whose mass percentage is 93.9%, a conductive agent whose mass percentage is 2%, and a binder polyvinylidene fluoride whose mass percentage is 3% were mixed in a solvent N-methylpyrrolidone, then a dispersant HNBR whose mass percentage is 1.1% was added, and they were fully mixed in a stirring tank, and stirred, where the stirring includes first stirring and second stirring, the first stirring is at a stirring speed of 600 rpm and lasts for a stirring time of 30 min, and the second stirring is at a stirring speed of 1600 rpm and lasts for a stirring time of 260 min. A positive electrode slurry was prepared after dispersing. After the stirring process was completed, the positive electrode slurry was delivered to a coating process, where mass percentages of the positive electrode active material, the conductive agent, the binder, and the dispersant were calculated based on a total mass of the solid in the positive electrode slurry. The conductive agent includes conductive carbon black whose mass percentage is 1.33% and single-walled carbon nanotubes whose mass percentage is 0.67%, the conductive carbon black has a specific surface area of 85 $m^2/g$ and an oil absorption value of 200 ml/100 g, the single-walled carbon nanotubes have an average length of 30 μm and a specific surface area of 300 $m^2/g$, and the mass content of metal impurity in the single-walled carbon nanotubes is <1 wt %.

The positive electrode slurry was transfer-applied to a current collector aluminum foil, was dried, and was hot-pressed, obtain a positive electrode plate with a positive electrode film layer having a single-side thickness of 105.64 μm and a compaction density of 2.36 $g/cm^3$. The speed of the transfer-coating is 20 m/min.

The hot pressing process includes a process of three times of hot rolling, hot rolling pressures are sequentially increased, and the hot rolling pressures are sequentially 40 metric tons, 60 metric tons, and 80 metric tons; a hot rolling temperature is 60° C.; and before entering hot rolling for a first time for compaction, the electrode plate is heated, and a heating temperature is 40° C.

The compaction density herein refers to a compaction density in a fully-discharged state of the battery cell. For a test method of the compaction density, refer to the following.

A median $C_{50}$ of the graphitization degree of the positive electrode film layer is 1.005. A porosity of the positive electrode film layer is 16.1%. An iron dissolution rate of the positive electrode material is 974 ppm. A total area percentage of the agglomeration region of the conductive agent is 1.99%.

The positive electrode plates were slit and punched into specified shapes. The punched positive electrode plates were then sorted by weight using a weight sorting machine for stacking by a stacking machine.

(3) Preparation of a Negative Electrode Plate

Natural graphite, a conductive agent: conductive carbon black, a binder: styrene-butadiene rubber (SBR), and a thickener: sodium carboxymethyl cellulose (CMC) were mixed uniformly at a weight ratio of 95:1:2:2, were added to deionized water, stirred, and dispersed, to obtain a negative electrode slurry. The negative electrode slurry was applied to a substrate: copper foil, followed by drying, compacting, dividing, and plate production, to obtain a negative electrode plate.

The negative electrode plates were slit and punched into specified shapes. The punched negative electrode plates were then sorted by weight using a weight sorting machine for stacking by a stacking machine.

(4) Separator

Polyvinylidene fluoride (PVDF) was dissolved in N-methylpyrrolidone (NMP) and stirred uniformly, polyethylene glycol (PEG) was then added as a pore-forming agent, and after thorough stirring and mixing, a bonding layer solution was obtained. The bonding layer solution was smeared on the foregoing base film having a ceramic layer on each of both sides, was pre-volatilized at 80° C., was dried at 110° C., and then was immersed in deionized water to dissolve PEG out, to obtain a separator having a bonding layer of a porous structure on each of both sides. The base film has a thickness of 8 μm, the single-side ceramic layer has a thickness of 3 μm, and the single-side bonding layer has a thickness of 1 μm.

(5) Electrolyte Solution

In a glove box ($H_2O$<0.1 ppm, $O_2$<0.1 ppm) in an argon gas atmosphere, organic solvents dimethyl carbonate (DMC), ethyl methyl carbonate (EMC), and ethylene carbonate (EC) were mixed uniformly.

Then, lithium hexafluorophosphate was added, and dissolved in the organic solvents, causing the concentration of the lithium hexafluorophosphate to be 1.05 mol/L; and vinylene carbonate (VC) was added, and the solution was uniformly stirred, to obtain an electrolyte solution of Example 1.

Calculation is performed based on the total mass of the electrolyte solution, the mass content of the dimethyl carbonate is 26%, the mass content of the ethyl methyl carbonate is 43.3%, the mass content of the ethylene carbonate is 17.3%, and the mass content of the vinylene carbonat is 0.9%.

(6) Preparation of a Battery

The positive electrode plate, the separator, and the negative electrode plate are stacked in sequence using the stacking machine. The separator needs to achieve the function of isolating the positive and negative electrodes to obtain the stacked electrode assembly. Taping treatment is performed on the stacked electrode assembly to tightly encapsulate the electrode assembly. The taped stacked electrode assembly was placed in an outer package. The outer package is made of an aluminum laminate film. The aluminum laminate film is a composite structure composed of an inner polypropylene layer, a middle aluminum foil layer, and an outer nylon layer. The outer package of the aluminum laminate film underwent processing via a pocket forming machine and trimming to obtain the target shape and dimensions. Subsequently, the aluminum laminate film was thermally encapsulated to meet the sealing strength of the aluminum laminate film ≥25N/8 mm. The battery underwent vacuum baking and resting. Electrolyte solution was then injected, followed by sealing. Subsequently, the pouch-type battery underwent hot pressing and cold pressing operations. The hot pressing was performed at 45° C. for 2 minutes under a pressure of 90 $kg/cm^2$. The cold pressing was performed at 25° C. for 2 minutes under a pressure of 90 $kg/cm^2$). Finally, after processes such as formation, degassing, and trimming, the battery cell was obtained. The battery cell has a dimension of 600 mm in a length direction, a dimension of 125 mm in a width direction, a dimension of 20 mm in a thickness direction.

Preparation methods in Examples 2 to 5 are substantially the same as that in Example 1, and a difference lies in that, preparation methods for the positive electrode active material and the positive electrode plate are adjusted, and details are as follows:

Example 2

(1) Preparation of a Positive Electrode Active Material

Lithium dihydrogen phosphate, ferrous oxalate, polyethylene glycol with a weight-average molecular weight of 1000, polyethylene glycol with a weight-average molecular weight of 1500, titanium dioxide, and vanadium pentoxide were mixed uniformly in methanol and ground, to obtain a mixed raw material. A ratio of the lithium dihydrogen phosphate to the ferrous oxalate causes a molar ratio of the lithium to the iron to be 1.02:1.0. The ferrous oxalate has a particle size $D_{10}$ of 6.2 μm, a particle size $D_{50}$ of 60.8 μm, and a particle size $D_{90}$ of 106.5 μm. In the ferrous oxalate, the mass content of the Fe element is 30.6%, and the mass content of the iron element is 0.03%.

The mixed raw materials underwent multiple rounds of ball milling in a ball mill, followed by demagnetization to obtain the mixed slurry. The number of grinding cycles and grinding duration were controlled to achieve a particle size $Dv_{50}$ of 3.1 μm in the ground mixed slurry.

The mixed slurry was spray-dried to yield dried precursor powder, which exhibits a uniform light-yellow appearance.

The precursor powder was placed in a sintering furnace, was heated from 25° C. to 360° C. under nitrogen atmosphere at 2° C./min and maintained at the temperature for 3.5 h, was then heated to a second temperature of 775° C. at 5° C./min and maintained at the temperature for 10 h, and was cooled upon completion. Based on a total mass of the positive electrode active material, a mass content of the Ti element is 1050 ppm, and a mass content of the V element is 950 ppm.

The obtained material was milled by using a jet milling method with a wind volume in which a classification frequency is 22 Hz and a milling air pressure is 0.55 MPa, to obtain a lithium iron phosphate positive electrode active material whose surface has a carbon material.

$D_{10}$, $D_{50}$, $D_{90}$, and $Dv_{50}$ refer to data obtained through testing by using a Malvern laser scattering method.

(2) Preparation of a Positive Electrode Plate

The foregoing positive electrode active material whose mass percentage is 93.9%, a conductive agent whose mass percentage is 2%, and a binder polyvinylidene fluoride whose mass percentage is 3% were mixed in a solvent N-methylpyrrolidone, then a dispersant HNBR whose mass percentage is 1.1% was added, and they were fully mixed in a stirring tank, and stirred, to prepare a positive electrode slurry after dispersing. After the stirring process was completed, the positive electrode slurry was delivered to a coating process, where mass percentages of the positive electrode active material, the conductive agent, the binder, and the dispersant were calculated based on a total mass of the solid in the positive electrode slurry. The conductive agent includes conductive carbon black whose mass percentage is 1.33% and single-walled carbon nanotubes whose mass percentage is 0.67%, the conductive carbon black has a specific surface area of 85 $m^2/g$ and an oil absorption value of 200 ml/100 g, the single-walled carbon nanotubes have an average length of 30 μm and a specific surface area of 300 $m^2/g$, and the mass content of metal impurity in the single-walled carbon nanotubes is <1 wt %.

The positive electrode slurry was transfer-applied to a current collector aluminum foil, was dried, and was hot-pressed, obtain a positive electrode plate with a positive electrode film layer having a single-side thickness of 105.89 μm and a compaction density of 2.36 $g/cm^3$. The stirring includes pre-stirring and main stirring. A stirring speed of the pre-stirring is lower than that of the main stirring, the pre-stirring has a revolution speed of 25 rpm and a rotation speed of 500 rpm, and the time of the pre-stirring is 15 min.

The hot pressing process includes a process of three times of hot rolling, hot rolling pressures are sequentially increased, and the hot rolling pressures are sequentially 35 metric tons, 55 metric tons, and 75 metric tons; a hot rolling temperature is 65° C.; and before entering hot rolling for a first time for compaction, the electrode plate is heated, and a heating temperature is 50° C. The compaction density herein refers to a compaction density in a fully-discharged state of the battery cell. For a test method of the compaction density, refer to the following.

The positive electrode plates were slit and punched into specified shapes. The punched positive electrode plates were then sorted by weight using a weight sorting machine for stacking by a stacking machine.

Example 3

(1) Preparation of a Positive Electrode Active Material

Lithium carbonate, iron phosphate, sucrose, glucose, titanium dioxide, and vanadium pentoxide were added to water, and mixed in a premix tank at a rotation speed of 1800 rpm, where a ratio of the lithium carbonate to the iron phosphate causes a molar ratio of iron to phosphorous to be 0.975, a mass content of glucose relative to the iron phosphate is 3.8%, and a mass content of the sucrose relative to the iron phosphate is 1.9%.

Two times of grinding were performed on the mixed raw material in a sand grinder, a first time of grinding was performed under conditions of using a zirconium oxide ball with a diameter of 0.6 mm and a rotation speed of 500 rpm, where a grinding time length is 1 h, and a grinding cavity pressure is less than 0.3 MPa, and then a second time of grinding was performed, to obtain a mixed slurry, where a particle size DV50 of the mixed slurry is 0.43 μm.

The mixed slurry was spray-dried to obtain precursor powder.

The precursor powder was sintered to obtain a lithium iron phosphate positive electrode material, where a process of the sintering includes:

first time of sintering: sintering the precursor powder in a nitrogen gas atmosphere, increasing the temperature from 25° C. to 765° C. at a temperature increasing rate of 5° C./min, and holding the temperature for 10 h, to obtain a first sintered product after cooling;

grinding and mixing: adding 0.5% of sucrose based on the total mass of the first sintered product, 1% of glucose based on the total mass of the first sintered product, and 3.0% of polyethylene glycol based on the total mass of the first sintered product to the first sintered product; performing grinding (a third time of grinding) in two groups, where when the DV50 of the particles in the first group reaches 1.0 μm, the grinding is stopped (the grinding condition is 550 rpm, and the grinding time is 1 h), to obtain a first group of ground products, and when the DV50 of the particles in the second group reaches 0.40 μm, the grinding is stopped (the grinding condition is 500 rpm, and the grinding time is 4 h), to obtain a second group of ground products; mixing the first group of ground products and the second group of ground products according to a mass ratio of 72:28, to obtain a mixed intermediate product; and spray-drying the mixed intermediate product; and second time of sintering: sintering the dried mixed intermediate product in a nitrogen gas atmosphere, increasing the temperature from 25° C. to 800° C. at a temperature increasing rate of 5° C./min, and holding the temperature for 10 h, to obtain a second sintered product after cooling.

The temperature is cooled to below 100° C. after the sintering is completed, and crush the second sintered product by using a method of jet milling, to obtain a lithium iron phosphate positive electrode active material whose surface has a carbon material, where a grading frequency of the jet milling is 25 Hz, and a milling air pressure is 0.55 MPa. Based on a total mass of the positive electrode active material, a mass content of the Ti element is 1050 ppm, and a mass content of the V element is 950 ppm.

(2) Preparation of a Positive Electrode Plate

The foregoing positive electrode active material whose mass percentage is 93.9%, a conductive agent whose mass percentage is 2%, and a binder polyvinylidene fluoride whose mass percentage is 3% were mixed in a solvent N-methylpyrrolidone, then a dispersant HNBR whose mass percentage is 1.1% was added, and they were fully mixed in a stirring tank, and stirred, to prepare a positive electrode slurry after dispersing. After the stirring process was completed, the positive electrode slurry was delivered to a coating process, where mass percentages of the positive electrode active material, the conductive agent, the binder, and the dispersant were calculated based on a total mass of the solid in the positive electrode slurry. The conductive agent includes conductive carbon black whose mass percentage is 1.33% and single-walled carbon nanotubes whose mass percentage is 0.67%, the conductive carbon black has a specific surface area of 85 $m^2/g$ and an oil absorption value of 200 ml/100 g, the single-walled carbon nanotubes have an average length of 30 μm and a specific surface area of 300 $m^2/g$, and the mass content of metal impurity in the single-walled carbon nanotubes is <1 wt %.

The positive electrode slurry was transfer-applied to a current collector aluminum foil, was dried, and was hot-pressed, obtain a positive electrode plate with a positive electrode film layer having a single-side thickness of 106.21 μm and a compaction density of 2.37 $g/cm^3$. The drying is at a temperature of 95° C. and a speed of 2.0 m/min.

The hot pressing process includes a process of three times of hot rolling, hot rolling pressures are sequentially increased, and the hot rolling pressures are sequentially 35 metric tons, 55 metric tons, and 75 metric tons; a hot rolling temperature is 65° C.; and before entering hot rolling for a first time for compaction, the electrode plate is heated, and a heating temperature is 50° C. The compaction density herein refers to a compaction density in a fully-discharged state of the battery cell. For a test method of the compaction density, refer to the following.

The positive electrode plates were slit and punched into specified shapes. The punched positive electrode plates were then sorted by weight using a weight sorting machine for stacking by a stacking machine.

Example 4

A preparation method in Example 4 was substantially the same as that in Example 1, and a difference lies in that, a preparing process of the positive electrode active material and a hot-pressing process of the positive electrode plate are slightly different, and differences specifically include:

(1) The carbon sources in the mixed raw material are sucrose and glucose, the mass of the sucrose is 2 wt % compared with the mass of the iron phosphate, and the mass of the glucose is 4 wt % compared with the mass of the iron phosphate.

(2) The processes of temperature-rising and sintering are different. At least two times of sintering were performed on the precursor powder in a nitrogen gas atmosphere, where the temperature of the first time of sintering is 765° C., and the holding time is 8 hours, to obtain an initially-sintered product.

1.5 wt % (based on the mass of the initially-sintered product) of glucose, 3.0 wt % (based on the mass of the initially-sintered product) of polyethylene glycol, titanium dioxide, and vanadium pentoxide were added to the initially-sintered product, and the initially-sintered product was uniformly ground, and then was divided into two groups for the second time of grinding. Grinding parameters of the two groups are different, and DV50 of the first group of ground particles is controlled to be 2.2 μm, and DV50 of the second group of ground particles is controlled to be 0.4 μm. The first group of ground particles and the second group of ground particles were mixed according to a mass ratio of 30:70, were spray-dried, and were subjected to the second time of sintering. The temperature of the second time of sintering is 815° C., and the temperature is maintained for 10 hours. based on a total mass of the positive electrode active material, a mass content of the Ti element is 1050 ppm, and a mass content of the V element is 950 ppm.

(3) The positive electrode slurry was transfer-applied to a current collector aluminum foil, was dried, and was hot-pressed, obtain a positive electrode plate with a positive electrode film layer having a single-side thickness of 106.34 μm and a compaction density of 2.37 $g/cm^3$. The drying is at a temperature of 95° C. and a speed of 2.0 m/min.

The hot pressing process includes a process of three times of hot rolling, hot rolling pressures are sequentially increased, and the hot rolling pressures are sequentially 35 metric tons, 55 metric tons, and 70 metric tons; a hot rolling temperature is 65° C.; and before entering hot rolling for a first time for compaction, the electrode plate is heated, and a heating temperature is 50° C. The compaction density herein refers to a compaction density in a fully-discharged state of the battery cell. For a test method of the compaction density, refer to the following.

Example 5

A preparation method in Example 5 was substantially the same as that in Example 1, and a difference lies in that, a sintering process of the positive electrode active material and a hot-pressing process of the positive electrode plate have differences, which are specifically as follows:

(1) Two-stage temperature-rising and sintering were performed on the precursor powder in a nitrogen gas atmosphere to obtain a positive electrode active material: the temperature was risen from 25° C. to 440° C. (the first temperature-rising stage) at a temperature-rising rate of 2° C./min, and was held for 2.5 h; and the temperature was risen from 440° C. to 760° C. (the second temperature-rising stage) at a temperature-rising rate of 5° C./min, and was held for 11 h; and then, the jet milling strength was increased to obtain a lithium iron phosphate positive electrode active material whose surface has a carbon material.

(2) The positive electrode slurry was transfer-applied to a current collector aluminum foil, was dried, and was hot-pressed, obtain a positive electrode plate with a positive electrode film layer having a single-side thickness of 105.65 μm and a compaction density of 2.36 $g/cm^3$. The speed of the transfer-coating is 20 m/min.

The hot pressing process includes a process of three times of hot rolling, hot rolling pressures are sequentially increased, and the hot rolling pressures are sequentially 45 metric tons, 60 metric tons, and 80 metric tons; a hot rolling temperature is 60° C.; and before entering hot rolling for a first time for compaction, the electrode plate is heated, and a heating temperature is 40° C.

Preparation methods in Examples 6 to 11 are substantially the same as that in Example 1, and a difference lies in that, a preparation method for the positive electrode plate is adjusted, and details are as follows:

Example 6

The positive electrode slurry of Example 1 was transfer-applied to a current collector aluminum foil, was dried, and was hot-pressed by adjusting a pressure in a hot-pressing process, a calendering speed, a roll gap, a pressure holding time, and a calendering count, and controlling a coating surface density, obtain a positive electrode plate with a positive electrode film layer having a single-side thickness of 91.88 μm, where a compaction density of the positive electrode plate is 2.36 g/$cm^3$. The compaction density herein refers to a compaction density in a fully-discharged state of the battery cell. For a test method of the compaction density, refer to the following. The quantity of laminated layers is kept unchanged, and the thickness of the battery cell is adaptively adjusted according to the thickness of the positive electrode film layer.

Example 7

The positive electrode slurry of Example 1 was transfer-applied to a current collector aluminum foil, was dried, and was hot-pressed by adjusting a pressure in a hot-pressing process, a calendering speed, a roll gap, a pressure holding time, and a calendering count, and controlling a coating surface density, obtain a positive electrode plate with a positive electrode film layer having a single-side thickness of 116.09 μm, where a compaction density of the positive electrode plate is 2.36 g/$cm^3$. The compaction density herein refers to a compaction density in a fully-discharged state of the battery cell. For a test method of the compaction density, refer to the following. The quantity of laminated layers is kept unchanged, and the thickness of the battery cell is adaptively adjusted according to the thickness of the positive electrode film layer.

Example 8

The positive electrode slurry of Example 1 was transfer-applied to a current collector aluminum foil, was dried, and was hot-pressed by adjusting a pressure in a hot-pressing process, a calendering speed, a roll gap, a pressure holding time, and a calendering count, and controlling a coating surface density, obtain a positive electrode plate with a positive electrode film layer having a single-side thickness of 72.34 μm, where a compaction density of the positive electrode plate is 2.36 g/$cm^3$. The compaction density herein refers to a compaction density in a fully-discharged state of the battery cell. For a test method of the compaction density, refer to the following. The quantity of laminated layers is kept unchanged, and the thickness of the battery cell is adaptively adjusted according to the thickness of the positive electrode film layer.

Example 9

The positive electrode slurry of Example 1 was transfer-applied to a current collector aluminum foil, was dried, and was hot-pressed by adjusting a pressure in a hot-pressing process, a calendering speed, a roll gap, a pressure holding time, and a calendering count, and controlling a coating surface density, obtain a positive electrode plate with a positive electrode film layer having a single-side thickness of 83.91 μm, where a compaction density of the positive electrode plate is 2.36 g/$cm^3$. The compaction density herein refers to a compaction density in a fully-discharged state of the battery cell. For a test method of the compaction density, refer to the following. The quantity of laminated layers is kept unchanged, and the thickness of the battery cell is adaptively adjusted according to the thickness of the positive electrode film layer.

Example 10

The positive electrode slurry of Example 1 was transfer-applied to a current collector aluminum foil, was dried, and was hot-pressed by adjusting a pressure in a hot-pressing process, a calendering speed, a roll gap, a pressure holding time, and a calendering count, and controlling a coating surface density, obtain a positive electrode plate with a positive electrode film layer having a single-side thickness of 98.93 μm, where a compaction density of the positive electrode plate is 2.52 g/$cm^3$. The compaction density herein refers to a compaction density in a fully-discharged state of the battery cell. For a test method of the compaction density, refer to the following. The quantity of laminated layers is kept unchanged, and the thickness of the battery cell is adaptively adjusted according to the thickness of the positive electrode film layer.

Example 11

The foregoing positive electrode active material whose mass percentage is 93.9%, a conductive agent whose mass percentage is 2%, and a binder polyvinylidene fluoride whose mass percentage is 3% were mixed in a solvent N-methylpyrrolidone, then a dispersant HNBR whose mass percentage is 1.1% was added, and they were fully mixed in a stirring tank, and stirred, where the stirring includes first stirring and second stirring, the first stirring is at a stirring speed of 400 rpm and lasts for a stirring time of 15 min, and the second stirring is at a stirring speed of 1200 rpm and lasts for a stirring time of 150 min. A positive electrode slurry was prepared after dispersing. After the stirring process was completed, the positive electrode slurry was delivered to a coating process.

A preparation method in Comparative Example 1 was substantially the same as that in Example 1, and a difference lies in that, a preparation method for the positive electrode active material is adjusted, and details are as follows:

Comparative Example 1

A preparation method in Comparative Example 1 was substantially the same as that in Example 1, and a difference lies in that, sintering processes of the positive electrode active material have differences, which are specifically as follows:

Two-stage temperature-rising and sintering were performed on the precursor powder in a nitrogen gas atmosphere to obtain a positive electrode active material: the temperature was risen from 25° C. to 500° C. (the first temperature-rising stage) at a temperature-rising rate of 2° C./min, and was held for 3.5 h; and the temperature was risen from 500° C. to 800° C. (the second temperature-rising stage) at a temperature-rising rate of 5° C./min, and was held for 13 h; and then, the jet milling strength was decreased to obtain a lithium iron phosphate positive electrode active material whose surface has a carbon material.

A preparation method in Comparative Example 2 was substantially the same as that in Example 1, and a difference lies in that, a preparation method for the separator is adjusted, and details are as follows:

Polyvinylidene fluoride (PVDF) and a dispersant were added to deionized water, and stirred uniformly; a thickener and a water-based binder were added to the stirred solution, the mixed solution was placed in a sand grinder and stirred uniformly, to obtain a bonding layer slurry; and the bonding layer slurry was sprayed onto a base film having a ceramic layer on each of both sides, was pre-volatilized at 80° C., and was dried at 90° C., to obtain a separator having a bonding layer of an island-shaped structure.

The base film has a thickness of 8 μm, the single-side ceramic layer has a thickness of 3 μm, and the single-side bonding layer has a thickness of 1 μm.

Test Method:

1. Capacity of a Battery Cell

The battery cell is charged to 3.65V at a charging rate of 0.5 C of the nominal capacity of the battery cell at 25° C., then is charged to 0.05 C at a constant voltage of 3.65V, and is rested for 10 min, then is discharged to 2.5V at a discharging rate of 1 C, and is rested for 10 min. The capacity C in a discharging process is calculated by using the formula C=I*t, and the unit is Ah.

2. Cycle Count Corresponding to the Capacity Fading to 90%

The battery cell is charged to 3.65V at a charging rate of 0.5 C of the nominal capacity of the battery cell at 25° C., then is charged to 0.05 C at a constant voltage of 3.65V, and is rested for 10 min, then is discharged to 2.5V at a discharging rate of 1 C, and is rested for 10 min. The foregoing one time of charging and discharging is one cycle, the test is stopped until the capacity of the battery fades to 90% of the nominal capacity, and the number of times of charging and discharging is recorded as the cycle count @90% SOH.

TABLE 1

| | Positive electrode plate | | | | | | |
|---|---|---|---|---|---|---|---|
| | Area percentage of the particles whose particle size is greater than or equal to 1 μm in the cross-section of the positive electrode film layer in the thickness direction of the electrode plate | Compaction density g/cm³ of the positive electrode plate when the battery cell is in a fully-discharged state | Median $B_{50}$ of coating values | Median $L_{A50}$ of sphericity of the particles whose particle size is greater than or equal to 1 μm in the cross-section of the positive electrode film layer in the thickness direction of the electrode plate | Single-side thickness μm of the positive electrode film layer | Capacity Ah of a battery cell | Cycle count/Cycles corresponding to the capacity fading to 90% |
| Example 1 | 36.64% | 2.36 | 0.369 | 0.687 | 105.64 | 160 | 1009 |
| Example 2 | 34.78% | 2.36 | 0.446 | 0.673 | 105.89 | 162 | 1064 |
| Example 3 | 34.95% | 2.37 | 0.368 | 0.745 | 106.21 | 162 | 1097 |
| Example 4 | 49.96% | 2.37 | 0.456 | 0.72 | 106.34 | 161 | 967 |
| Example 5 | 12.02% | 2.36 | 0.355 | 0.75 | 105.65 | 159 | 1059 |
| Example 6 | 38.09% | 2.36 | 0.368 | 0.67 | 91.88 | 140 | 957 |
| Example 7 | 38.44% | 2.36 | 0.368 | 0.653 | 116.09 | 177 | 939 |
| Example 8 | 36.29% | 2.36 | 0.369 | 0.69 | 72.34 | 110 | 1067 |
| Example 9 | 36.37% | 2.36 | 0.369 | 0.688 | 83.91 | 128 | 1045 |
| Example 10 | 36.88% | 2.52 | 0.369 | 0.685 | 98.93 | 159 | 990 |
| Comparative Example 1 | 55.91% | 2.36 | 0.368 | 0.631 | 105.44 | 159 | 910 |

TABLE 2

| | Surface topography of the bonding layer of the separator | Capacity Ah of a battery cell | Cycle count/Cycles corresponding to the capacity fading to 90% |
|---|---|---|---|
| Example 1 | Porous structure | 160 | 1009 |
| Comparative Example 2 | Island-shaped structure | 160 | 918 |

As can be learned from Table 1 and Table 2, it can be seen from a comparison between the examples and the comparative examples that, in a cross-section of the positive electrode film layer in a thickness direction of the electrode plate, an area percentage of particles whose particle size is greater than or equal to 1 μm ranges from 12% to 50%, and when the bonding layer of the separator is a continuous layer having a porous structure, and the bonding layer includes a vinylidene fluoride polymer, the battery cell reduces the risk that mutual pressing in the thickness direction of the positive and negative electrode plates become misplaced horizontally in a process of rebounding of the electrode assembly while maintaining a good capacity, thereby reducing a probability that the positive and negative electrode overlap and further cause a short circuit, and improving the cycle performance of the battery.

It may be learned from comparisons between Example 4 and Examples 1 to 3, and 5 that, in a cross-section of the positive electrode film layer in a thickness direction of the electrode plate, an area percentage of particles whose particle size is greater than or equal to 1 m ranges from 12% to 40%, which helps the battery maintain a high capacity, to further improve a phenomenon of rebounding of the electrode plate caused by a stress concentration easily occurring to large particles in the electrode plate, reduce a probability that the negative electrode film layer of the electrode plate contacts the positive electrode film layer and generates a short circuit, and further improve the cycle performance of the battery.

It may be learned from comparisons between Examples 8 and 9 and Examples 6 and 7 that, a single-side thickness H of the positive electrode film layer ranges from 90 μm to 120 μm, which helps further improve the capacity of the battery.

It may be learned from comparisons between Example 7 and Examples 1 to 6, and 8 to 10 that, in the cross-section of the positive electrode film layer in the thickness direction of the electrode plate, in an area-weighted cumulative distribution curve of sphericity of particles whose particle size is greater than or equal to 1 μm, a median $L_{A50}$ of sphericity ranges from 0.67 to 0.75, so that stress concentration of large particles can be further improved, and rebounding of the electrode plates caused by stress release in a cycle process can be reduced, thereby further improving the cycle life of the battery cell.

TABLE 3

| | Area percentage of the particles whose particle size is greater than or equal to 1 μm in the cross-section of the positive electrode film layer in the thickness direction of the electrode plate | Distribution uniformity of the particles having the particle size of greater than or equal to 1 μm in the first region | Capacity Ah of a lithium-ion secondary battery cell | Cycle count/Cycles corresponding to the capacity fading to 90% |
|---|---|---|---|---|
| Example 1 | 36.83% | 3.40% | 160 | 1009 |
| Example 11 | 36.85% | 4.96% | 160 | 995 |

It may be learned from a comparison between Example 11 and Example 1 that, the case that the distribution uniformity of particles whose particle size is greater than or equal to 1 μm in the first region ranges from 0.2% to 3.5% helps to reduce risks that local excessive pressing and local blocking of the lithium ion transmission path caused by uneven distribution of the large particles cause an increase in current density and easy lithium plating on the periphery, so that the cycle performance of the battery is further improved while the battery has a good capacity.

It should be noted that the present application is not limited to the above implementations. The above described examples are merely exemplary, and examples having substantially the same technical idea and the same effects within the scope of the technical solution of the present application are all included in the technical scope of the present application. In addition, other examples constructed by applying various modifications conceivable to those skilled in the art to the examples and combining some of the constituent elements of the examples without departing from the scope of the essence of the present application are also included in the scope of the present application.

What is claimed is:

1. A battery cell, comprising a stacked electrode assembly, wherein the stacked electrode assembly comprises a positive electrode plate, a negative electrode plate, and a separator disposed between the positive electrode plate and the negative electrode plate;

the positive electrode plate comprises a positive current collector and a positive electrode film layer disposed on at least one side of the positive current collector, the positive electrode film layer comprises lithium-containing transition metal phosphate particles, and at least a portion of a surface of the lithium-containing transition metal phosphate particles is provided with a carbon material; in a cross-section of the positive electrode film layer in a thickness direction of the positive electrode plate, an area percentage of particles whose particle size is greater than or equal to 1 μm ranges from 12% to 50%;

the separator comprises a base film, two ceramic layers respectively disposed on two sides of the base film, and at least one bonding layer, the two ceramic layers comprise a first ceramic layer close to the positive electrode plate and a second ceramic layer close to the negative electrode plate, the at least one bonding layer is disposed on a side of the first ceramic layer close to a side of the positive electrode plate and away from the base film, the at least one bonding layer is a continuous layer with a porous structure, and the at least one bonding layer comprises a vinylidene fluoride polymer;

in a cross-section of the positive electrode film layer in the thickness direction of the electrode plate, in an area-weighted cumulative distribution curve of sphericity of particles whose particle size is greater than or equal to 1 μm, a median $L_{A50}$ of sphericity ranges from 0.6 to 0.8.

2. The battery cell according to claim 1, wherein in the cross-section of the positive electrode film layer in the thickness direction of the positive electrode plate, an area percentage of particles whose particle size ranges from 1 μm to 5 μm ranges from 12% to 50%, and optionally ranges from 12% to 40%.

3. The battery cell according to claim 1, wherein the vinylidene fluoride polymer comprises one or more of polyvinylidene fluoride (PVDF) and a copolymer of vinylidene fluoride and hexafluoropropylene.

4. The battery cell according to claim 1, wherein a single-side thickness of the positive electrode film layer ranges from 70 μm to 120 μm.

5. The battery cell according to claim 1, wherein the positive electrode film layer comprises a first region, the first region is located at a top of the positive electrode film layer away from the positive current collector, a distribution uniformity of particles whose particle size is greater than or equal to 1 μm in the first region ranges from 0.2% to 5%.

6. The battery cell according to claim 1, wherein in a cumulative distribution curve of a graphitization degree C. value obtained from the positive electrode film layer in an area mapping mode of a laser microscopic confocal Raman spectrometer, a median $C_{50}$ of the graphitization degree is greater than or equal to 0.95 and less than or equal to 1.20, the graphitization degree C. value is $I_G/I_D$, $I_G$ represents an intensity of a G band at 1580±100 $cm^{-1}$ in Raman spectra, and $I_D$ represents the intensity of a D band at 1350±100 $cm^{-1}$ in Raman spectra.

7. The battery cell according to claim 1, wherein in a cumulative distribution curve of a coating value B obtained from the positive electrode film layer in an area mapping mode of a laser microscopic confocal Raman spectrometer, a median $B_{50}$ of the coating value ranges from 0.30 to 0.60, the coating value B is $I_P/I_D$, $I_P$ represents an intensity of a P band at 948±100 $cm^{-1}$ in Raman spectra, and $I_D$ represents the intensity of a D band at 1350±100 $cm^{-1}$ in Raman spectra.

8. The battery cell according to claim 1, wherein an iron dissolution rate of a positive electrode material ranges from 658 ppm to 1921 ppm.

9. The battery cell according to claim 1, wherein the lithium-containing transition metal phosphate particles in the positive electrode film layer comprise a component shown in the following general formula:

Formula I

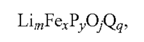

$Li_mFe_xP_yO_jQ_q$, wherein Q comprises one or more of Al, Na, K, Mg, Cu, Mn, Cr, Zn, Pb, Ca, Co, Ni, Sr, Nb, V, Ti, B, S, Si, N, F, Cl, Br, 0.8≤m≤1.15, 0.9≤x≤1, 0.95≤y≤1, 3.5≤j≤4, and 0≤q≤0.1.

10. The battery cell according to claim 1, wherein the lithium-containing transition metal phosphate particles comprise titanium, and based on a total mass of the lithium-containing transition metal phosphate particles in the positive electrode film layer, a mass content of titanium ranges from 500 ppm to 8000 ppm;

the lithium-containing transition metal phosphate particles comprise vanadium, and based on the total mass of the lithium-containing transition metal phosphate particles in the positive electrode film layer, a mass content of vanadium ranges from 500 ppm to 5000 ppm; and/or the positive electrode film layer further comprises a conductive agent, and based on a total area of the cross-section of the positive electrode film layer in the thickness direction of the electrode plate, a total area percentage of agglomeration regions of the conductive agent ranges from 0.2% to 6%, wherein the conductive agent comprises carbon nanotubes, the carbon nanotubes comprise one or more of single-walled carbon nanotubes, few-walled carbon nanotubes, and multi-walled carbon nanotubes; and/or the agglomeration regions of the conductive agent comprise carbon nanotubes and conductive carbon black, wherein based on a mass of the positive electrode film layer, a mass content C1 of the carbon nanotubes meets: $0<C1\leq 2.5\%$, and a mass content C2 of the conductive carbon black meets: $0<C1\leq 2.5\%$.

11. The battery cell according to claim 1, wherein the positive electrode film layer further comprises a dispersant, and the dispersant comprises hydrogenated nitrile butadiene rubber HNBR, wherein based on a mass of the positive electrode film layer, a mass content of the dispersant ranges from 0.5% to 2%.

12. The battery cell according to claim 1, wherein when the battery cell is in a fully-discharged state, a compaction density of the positive electrode plate ranges from 2.3 $g/cm^3$ to 2.6 $g/cm^3$; and/or a porosity of the positive electrode film layer ranges from 14% to 28%.

13. The battery cell according to claim 1, wherein a base coating layer is disposed in a bottom region of the positive electrode film layer close to the positive current collector, and the base coating layer meets at least one of the following conditions:

(1) the base coating layer comprises a conductive agent and a binder, the conductive agent comprises carbon nanotubes and conductive carbon black, and the binder comprises a vinylidene fluoride polymer; and (2) a thickness of the base coating layer ranges from 0.5 μm to 5 μm.

14. The battery cell according to claim 1, wherein the separator meets at least one of the following conditions:

(1) a thickness of the base film ranges from 7 μm to 9 μm;

(2) a single-side thickness of each of the two ceramic layers ranges from 2 μm to 4 μm; and (3) a single-side thickness of the at least one bonding layer ranges from 1 μm to 5 μm.

15. The battery cell according to claim 1, wherein the battery cell comprises a housing, the stacked electrode assembly is accommodated in the housing, a dimension of the housing in a length direction is L0, a dimension of the housing in a width direction is W0, a dimension of the housing in the thickness direction is H0, 450 mm≤L0≤1300 mm, 100 mm≤W0≤150 mm, and 14 mm≤H0≤22 mm, wherein a dimension L0 of the housing in the length direction meets: 450 mm≤L0≤650 mm; and/or a dimension L0 of the housing in the length direction meets: 900 mm≤L0≤1300 mm.

16. The battery cell according to claim 15, wherein the housing meets at least one of the following conditions:

(1) the housing is made of a pouch-type material, and the pouch-type material comprises an aluminum laminate composite film;

(2) the housing comprises a first sealing zone, and the first sealing zone is disposed at at least one end of the stacked electrode assembly extending along the width direction; the first sealing zone comprises a folded edge structure extending along the length direction, a sealing adhesive is disposed on the folded edge structure, and the sealing adhesive is continuously disposed in the length direction and secures the folded edge structure; and (3) the housing comprises at least one second sealing zone, the second sealing zone is disposed at at least one end of the stacked electrode assembly extending along the length direction of the housing, and the second sealing zone is disposed on a tab side of the stacked electrode assembly.

17. The battery cell according to claim 1, wherein an outer periphery of the stacked electrode assembly is provided with a plurality of adhesive rings surrounding along a width direction, and the adhesive rings surrounding along the width direction are disposed at intervals along a length direction.

18. A battery apparatus, comprising the battery cell according to claim 1.

19. A power consuming apparatus, wherein the power consuming apparatus comprises the battery apparatus according to claim 18, and the battery apparatus is configured to supply electric energy.

20. An energy storage apparatus, wherein the energy storage apparatus comprises the battery apparatus according to claim 18, and the battery apparatus is configured to store electric energy.

21. A battery cell, comprising a housing and a stacked electrode assembly accommodated in the housing, wherein the stacked electrode assembly comprises a positive electrode plate, a negative electrode plate, and a separator disposed between the positive electrode plate and the negative electrode plate;

the positive electrode plate comprises a positive current collector and a positive electrode film layer disposed on at least one side of the positive current collector, the positive electrode film layer comprises lithium-containing transition metal phosphate particles, and at least a portion of a surface of the lithium-containing transition metal phosphate particles is provided with a carbon material; in a cross-section of the positive electrode film layer in a thickness direction of the positive electrode plate, an area percentage of particles whose particle size is greater than or equal to 1 μm ranges from 12% to 50%;

the separator comprises a base film, two ceramic layers respectively disposed on two sides of the base film, and at least one bonding layer, the two ceramic layers comprise a first ceramic layer close to the positive electrode plate and a second ceramic layer close to the negative electrode plate, the at least one bonding layer is disposed on a side of the first ceramic layer close to a side of the positive electrode plate and away from the base film, the at least one bonding layer is a continuous layer with a porous structure, and the at least one bonding layer comprises a vinylidene fluoride polymer;

a dimension of the housing in a length direction is L0, a dimension of the housing in a width direction is W0, a dimension of the housing in the thickness direction is H0, 450 mm≤L0≤1300 mm, 100 mm≤W0≤150 mm, and 14 mm≤H0≤22 mm.

22. A battery cell, comprising a stacked electrode assembly, wherein the stacked electrode assembly comprises a positive electrode plate, a negative electrode plate, and a separator disposed between the positive electrode plate and the negative electrode plate;

the positive electrode plate comprises a positive current collector and a positive electrode film layer disposed on at least one side of the positive current collector, the positive electrode film layer comprises lithium-containing transition metal phosphate particles, and at least a portion of a surface of the lithium-containing transition metal phosphate particles is provided with a carbon material; in a cross-section of the positive electrode film layer in a thickness direction of the positive electrode plate, an area percentage of particles whose particle size is greater than or equal to 1 μm ranges from 12% to 50%;

the separator comprises a base film, two ceramic layers respectively disposed on two sides of the base film, and at least one bonding layer, the two ceramic layers comprise a first ceramic layer close to the positive electrode plate and a second ceramic layer close to the negative electrode plate, the at least one bonding layer is disposed on a side of the first ceramic layer close to a side of the positive electrode plate and away from the base film, the at least one bonding layer is a continuous layer with a porous structure, and the at least one bonding layer comprises a vinylidene fluoride polymer;

an outer periphery of the stacked electrode assembly is provided with a plurality of adhesive rings surrounding along a width direction, and the adhesive rings surrounding along the width direction are disposed at intervals along a length direction.

* * * * *